United States Patent
Xu et al.

(10) Patent No.: US 11,337,079 B2
(45) Date of Patent: May 17, 2022

(54) 5G NEW RADIO UNLICENSED BAND CELL ACCESS

(71) Applicant: Apple Inc., Cupertino, CA (US)

(72) Inventors: Fangli Xu, Beijing (CN); Dawei Zhang, Saratoga, CA (US); Haijing Hu, Beijing (CN); Longda Xing, San Jose, CA (US); Murtaza A. Shikari, Mountain View, CA (US); Sethuraman Gurumoorthy, San Jose, CA (US); Sree Ram Kodali, Sunnyvale, CA (US); Srinivasan Nimmala, San Jose, CA (US); Srirang A. Lovlekar, Cupertino, CA (US); Xu Ou, San Jose, CA (US); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 4 days.

(21) Appl. No.: 16/557,049

(22) Filed: Aug. 30, 2019

(65) Prior Publication Data

US 2020/0145835 A1    May 7, 2020

Related U.S. Application Data

(60) Provisional application No. 62/754,647, filed on Nov. 2, 2018.

(51) Int. Cl.
| | | |
|---|---|---|
| *H04W 16/14* | (2009.01) | |
| *H04L 5/00* | (2006.01) | |
| *H04W 8/24* | (2009.01) | |
| *H04W 76/30* | (2018.01) | |
| *H04W 88/06* | (2009.01) | |
| *H04W 76/11* | (2018.01) | |

(52) U.S. Cl.
CPC ......... *H04W 16/14* (2013.01); *H04L 5/0051* (2013.01); *H04W 8/24* (2013.01); *H04W 76/11* (2018.02); *H04W 76/30* (2018.02); *H04W 88/06* (2013.01)

(58) Field of Classification Search
CPC ..... H04W 16/14; H04W 88/06; H04W 36/08; H04W 36/14; H04W 36/00; H04W 36/0085; H04W 48/20; H04B 17/309
See application file for complete search history.

(56) References Cited

U.S. PATENT DOCUMENTS

| | | |
|---|---|---|
| 7,640,036 B2 | 12/2009 | Kallio |
| 8,005,076 B2 | 8/2011 | Gallagher |
| 10,129,759 B2 | 11/2018 | Clegg |
| 2009/0274086 A1* | 11/2009 | Petrovic ................ H04W 48/10 370/312 |

(Continued)

*Primary Examiner* — Elton Williams
(74) *Attorney, Agent, or Firm* — Kowert, Hood, Munyon, Rankin & Goetzel, P.C.

(57) ABSTRACT

Apparatuses, systems, and methods for a wireless device to perform methods to implement mechanisms for non-standalone unlicensed band cells that support single carrier capable UEs. A UE may camp on a licensed band cell of a RAN and transmit a request to connect. The UE may receive, from the licensed band cell, a connection setup message indicating a switch to an unlicensed band cell of the RAN and receive, from the unlicensed band cell, a reference signal. The UE may transmit to the unlicensed band cell and in response to confirming, based at least in part of the reference signal, radio quality and/or downlink timing of the unlicensed band cell, a connection complete/connection resume message.

20 Claims, 21 Drawing Sheets

(56) References Cited

U.S. PATENT DOCUMENTS

| | | | |
|---|---|---|---|
| 2010/0246506 A1* | 9/2010 | Krishnaswamy | ............................ H04W 72/0453 370/329 |
| 2012/0039284 A1* | 2/2012 | Barbieri | ................ H04W 48/10 370/329 |
| 2018/0316454 A1* | 11/2018 | Damnjanovic | ...... H04J 11/0086 |
| 2020/0059927 A1* | 2/2020 | Sun | ........................ H04J 3/1694 |
| 2020/0252838 A1* | 8/2020 | Akdeniz | ................. H04W 4/70 |

* cited by examiner

5G NEW RADIO UNLICENSED BAND CELL ACCESS

PRIORITY DATA

This application claims benefit of priority to U.S. Provisional Application Ser. No. 62/754,647, titled "5G New Radio Unlicensed Band Cell Access", filed Nov. 2, 2018, which is hereby incorporated by reference in its entirety as though fully and completely set forth herein.

FIELD

The present application relates to wireless devices, and more particularly to apparatus, systems, and methods for non-stand-alone unlicensed band cells to support single carrier capable UEs in a fifth generation (5G) New Radio (NR) network.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE) comprised of Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards as well as access to unlicensed bands (e.g., via unlicensed band cells).

SUMMARY

Embodiments relate to apparatuses, systems, and methods for access to unlicensed bands via cells associated with a fifth generation (5G) New Radio (NR) network.

In some embodiments, a user equipment device (UE) may camp on a licensed band cell of a radio access network (RAN) and transmit, to the licensed band cell and in response to receiving first information from the licensed band cell, a request to connect to the licensed band cell. The UE may receive, from the licensed band cell, a connection setup message indicating a switch to an unlicensed band cell of the RAN and receive, from the unlicensed band cell, a reference signal. The UE may transmit to the unlicensed band cell and in response to confirming, based at least in part of the reference signal, radio quality and/or downlink timing of the unlicensed band cell, a connection complete/connection resume message. In some embodiments, the UE may perform data transmissions with the unlicensed band cell. In some embodiments, the UE may transmit, to the licensed band cell and in response to confirming, based at least in part of the reference signal, radio quality and/or downlink timing of the unlicensed band cell is not satisfactory, a connection complete/connection resume message and perform data transmissions with the licensed band cell. In some embodiments, a base station (e.g., a 5G NR base station) may support both the licensed band cell and the unlicensed band cell. In some embodiments, switching the UE to the unlicensed band cell may be based, at least in part, on any, any combination of, and/or all of a network policy, (current) network load and/or network traffic condition, a capability of the UE (e.g., single carrier capable), and/or a position of the UE (e.g., relative to both the licensed and unlicensed band cell). In some embodiments, the connection setup message may indicate any, any combination of, and/or all of an identifier for the unlicensed band cell, a cell radio network temporary identifier (C-RNTI) for the unlicensed band cell, and/or configuration requirements for CONNECTED mode on the unlicensed band cell.

In some embodiments, a network node, network entity or functional entity comprised within the network entity and/or within the network node may be configured to perform methods for UE access to unlicensed bands via cells associated with a fifth generation (5G) New Radio (NR) network. In some embodiments, a network node (or entity) may broadcast cell information and receive, from a UE camping on a licensed band cell, a request to connect to the licensed band cell. The network node (or entity) may determine, based in part on one or more factors, to direct the UE to connect to an unlicensed band cell within range of the UE and transmit, to the unlicensed band cell, a request to switch the UE to the unlicensed band cell. The network node (or entity) may receive from the unlicensed band cell, configuration information for the unlicensed band cell and transmit, to the UE, a setup message indicating the switch to the unlicensed band cell and the configuration information for the unlicensed band cell. In some embodiments, the network node (or entity) may receive, from the UE, a connection complete message, wherein the connection complete message indicates a failure of the UE to connect to the unlicensed band cell and perform, with the UE, data transmissions. In some embodiments, a base station (e.g., a 5G NR base station) may support both the licensed band cell and the unlicensed band cell. In some embodiments, switching the UE to the unlicensed band cell may be based, at least in part, on any, any combination of, and/or all of a network policy, (current) network load and/or network traffic condition, a capability of the UE (e.g., single carrier capable), and/or a position of the UE (e.g., relative to both the licensed and unlicensed band cell). In some embodiments, the connection setup message may indicate any, any combination of, and/or all of an identifier for the unlicensed band cell, a cell radio network temporary identifier (C-RNTI) for the unlicensed band cell, and/or configuration requirements for CONNECTED mode on the unlicensed band cell.

In some embodiments, a network node (or entity) may receive, from a licensed band cell, a request to switch a UE camped on the licensed band cell to an unlicensed band cell. The network node (or entity) may transmit, to the licensed band cell, configuration information for the unlicensed band cell and transmit, to the UE, a reference signal. The network node (or entity) may receive, from the UE, a connection complete/connection resume message. In some embodiments, the network node (or entity) may perform data transmissions with the UE. In some embodiments, a base station (e.g., a 5G NR base station) may support both the licensed band cell and the unlicensed band cell. In some embodiments, switching the UE to the unlicensed band cell may be based, at least in part, on any, any combination of, and/or all of a network policy, (current) network load and/or network traffic condition, a capability of the UE (e.g., single carrier capable), and/or a position of the UE (e.g., relative to both the licensed and unlicensed band cell). In some embodiments, the connection setup message may indicate any, any combination of, and/or all of an identifier for the unlicensed band cell, a cell radio network temporary identifier (C-RNTI) for the unlicensed band cell, and/or configuration requirements for CONNECTED mode on the unlicensed band cell.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
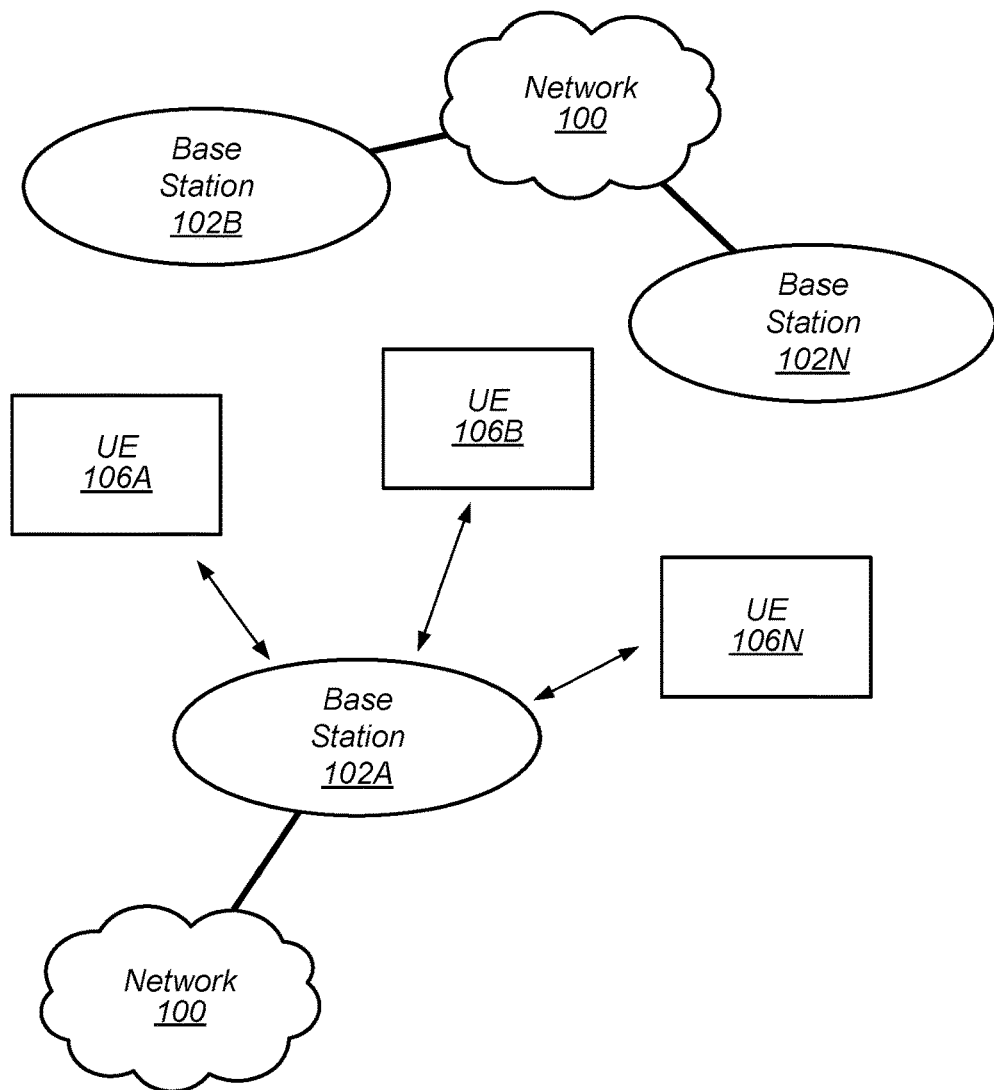
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic". Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system)

analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
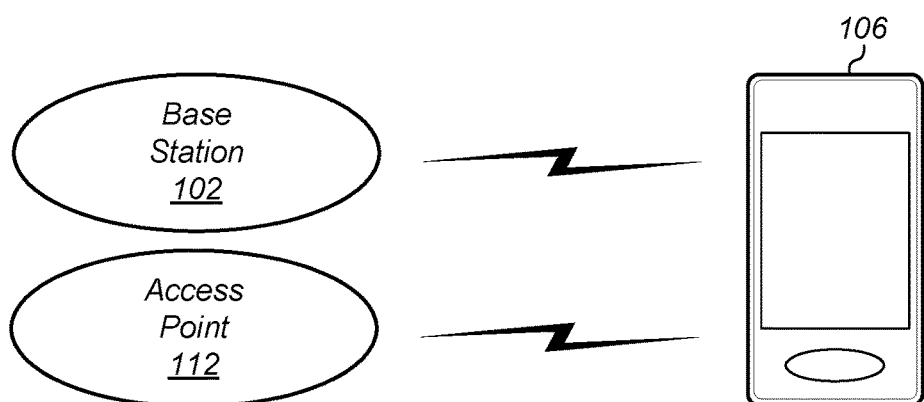
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), eLTE, 5G new radio (5G NR), HSPA, 3 GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternatively be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, eLTE, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, eLTE, or 5G NR using a single shared radio and/or GSM, LTE, LTE-Advanced, eLTE or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE/eLTE or 5G NR (or LTE or 1×RTT or LTE or GSM), and separate radios for communicating using each of Wi-Fi and Bluetooth. Other configurations are also possible.

Figure 2:
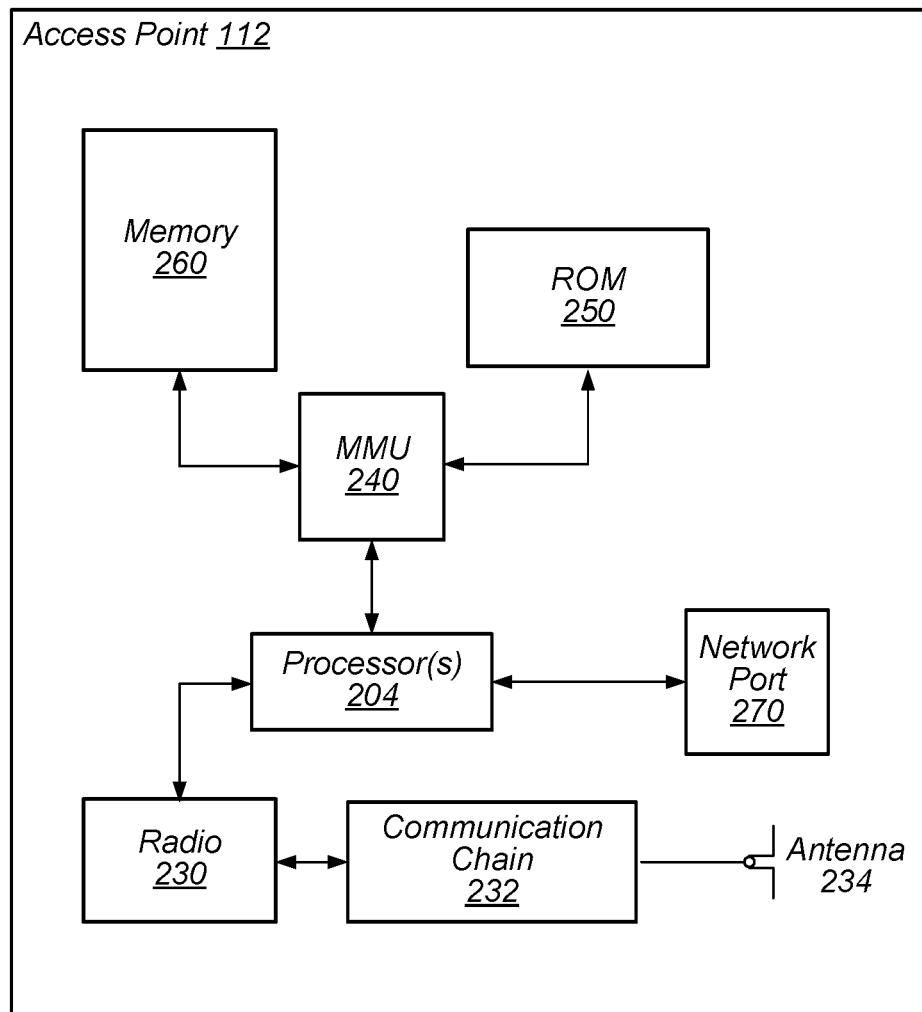
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), eLTE, Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to implement methods for non-standalone unlicensed band cells that support single carrier capable UEs, e.g., as further described herein.

Figure 3:
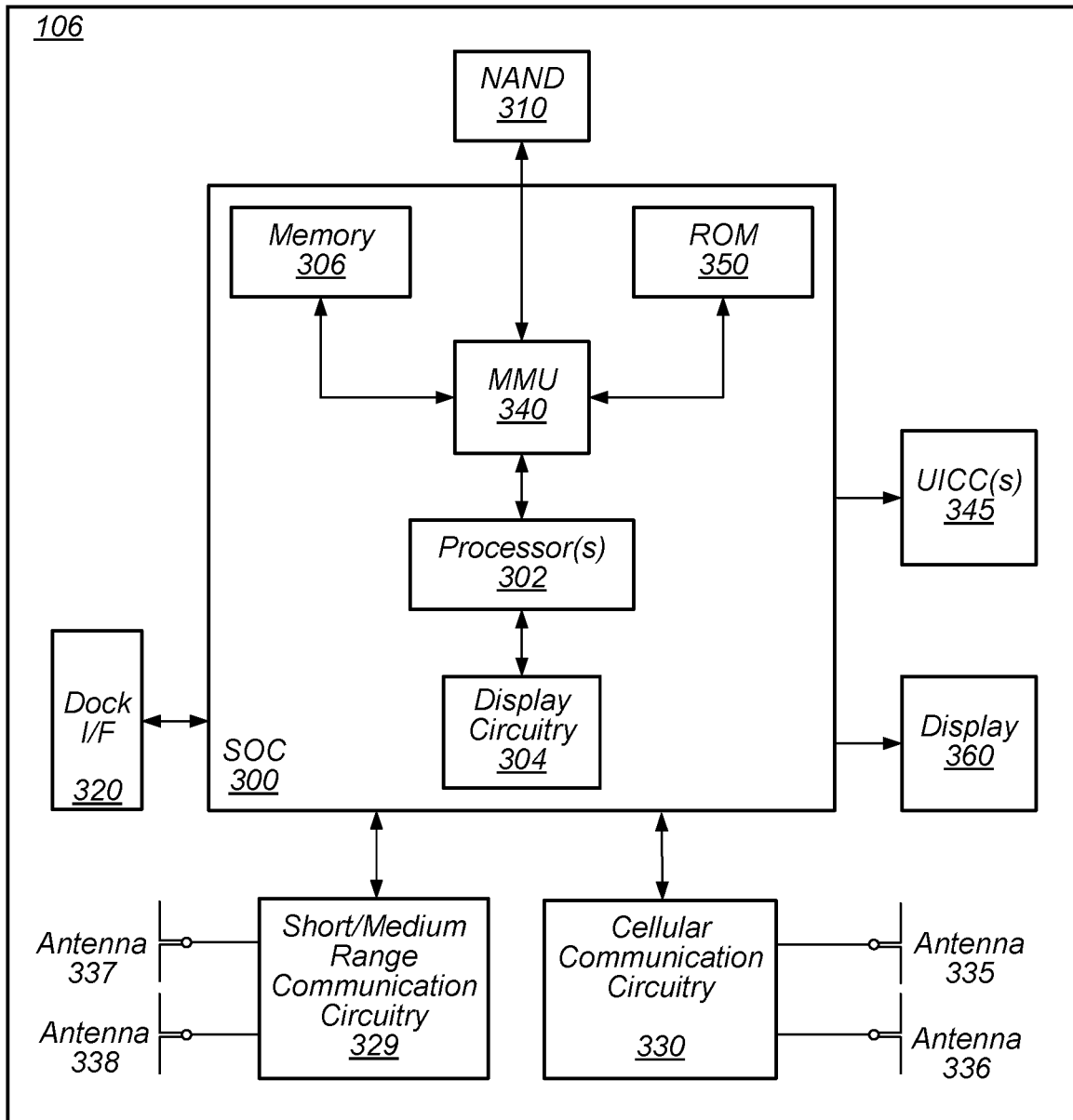
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, eLTE, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly dedicated processors and/or radios) for multiple RATs (e.g., a first receive chain for LTE/eLTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE/eLTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods to improve dual-registration in a 5G NR network, including notification procedure enhancements, dual-registration enhancements, and paging enhancements as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 4:
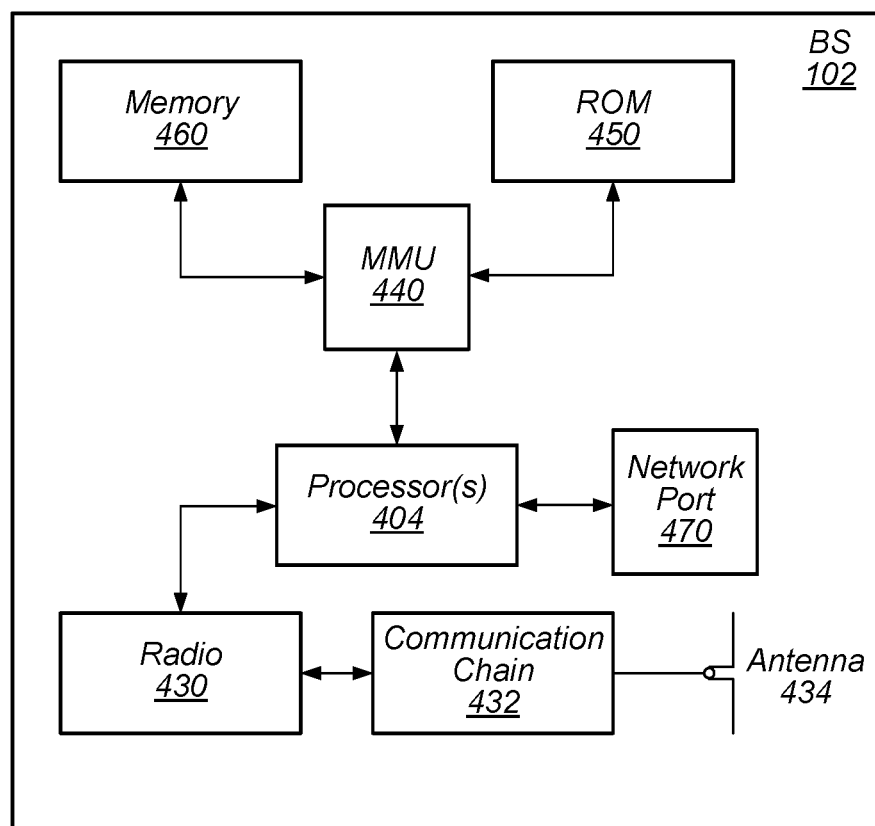
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, eLTE, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
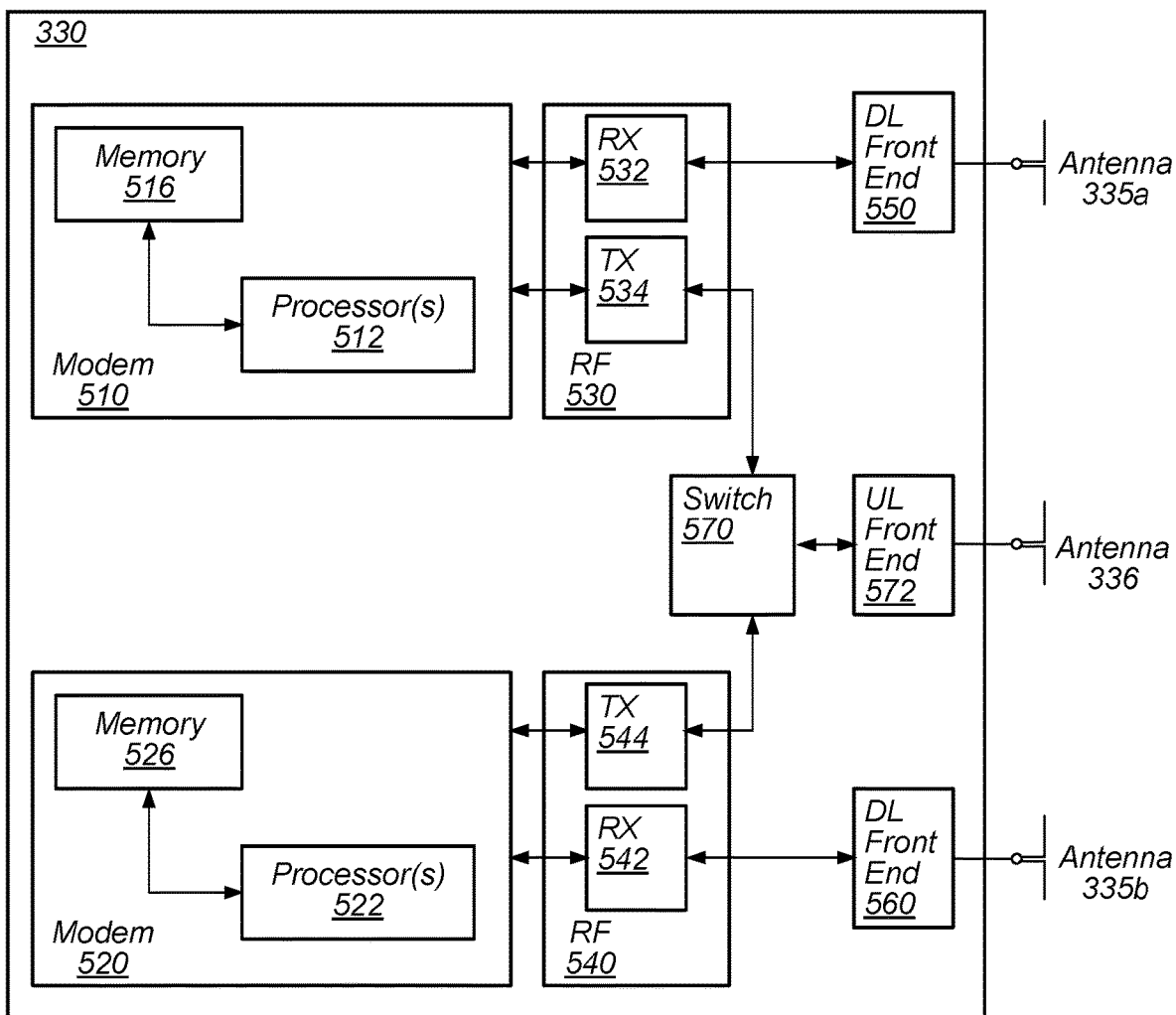
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as eLTE, LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods to improve dual-registration in a 5G NR network, including notification procedure enhancements, dual-registration enhancements, and paging enhancements as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
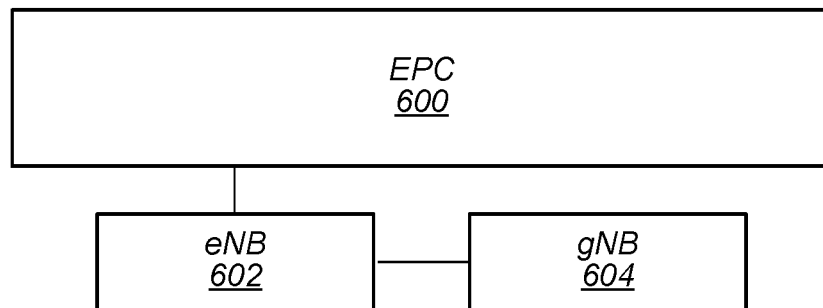
FIG. 6A illustrates an example of connections between an EPC network, an LTE base station (eNB), and a 5G NR base station (gNB).
Figure 6B:
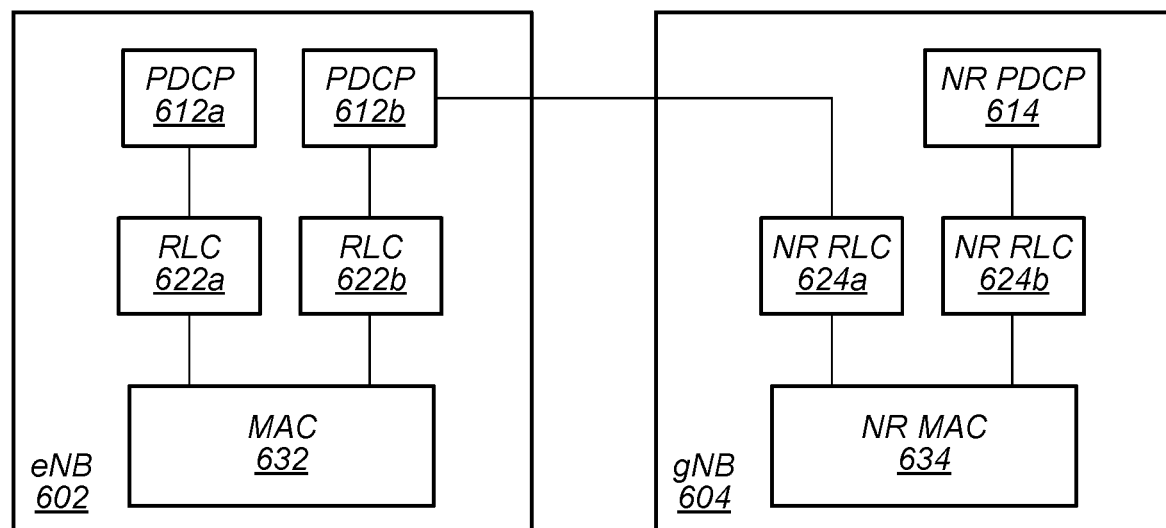
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602) and/or an evolution of an LTE base station (e.g., an eLTE eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE/eLTE may be used for control plane signaling and NR may be used for user plane signaling. Thus, LTE/eLTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
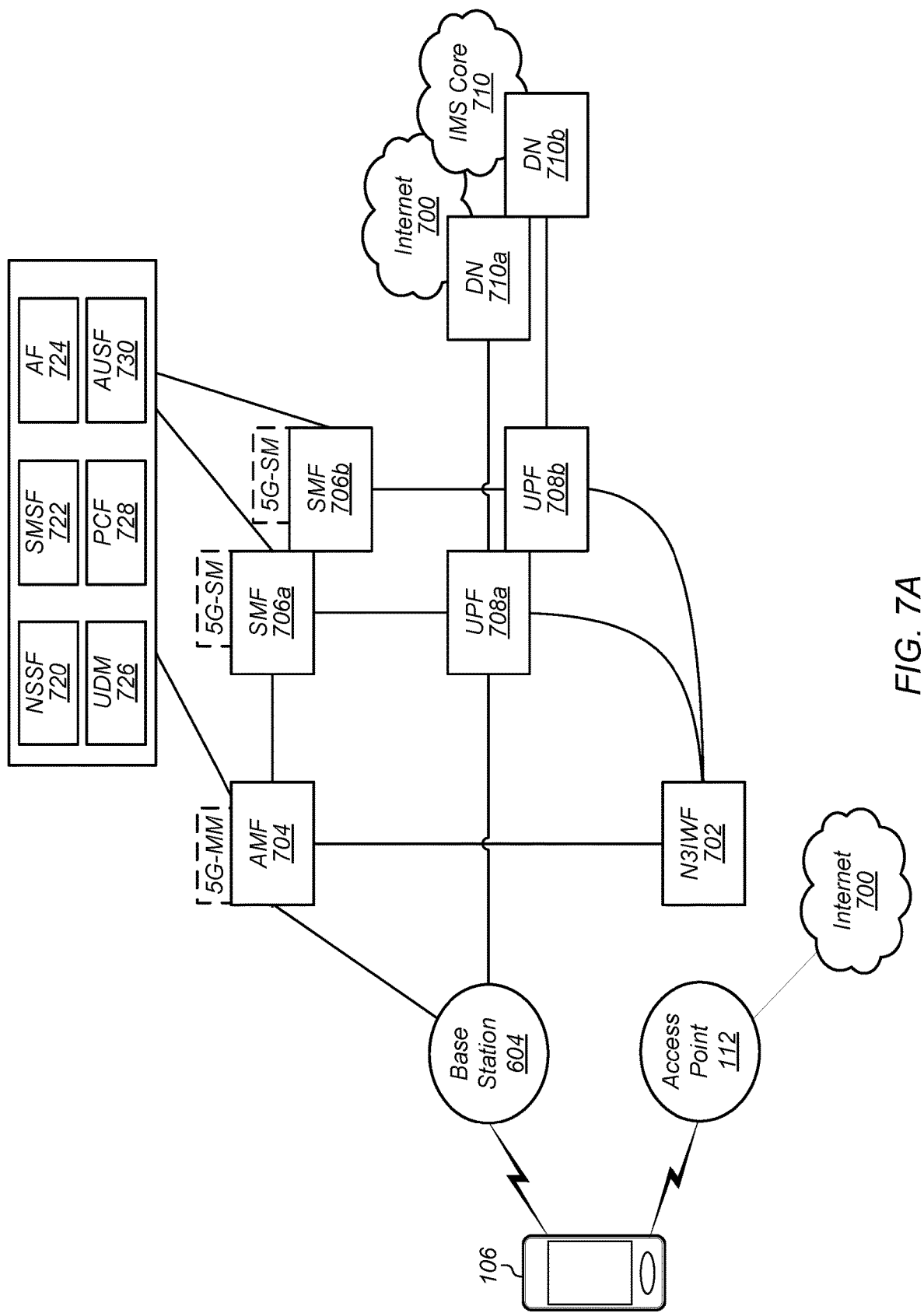
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Figure 7B:
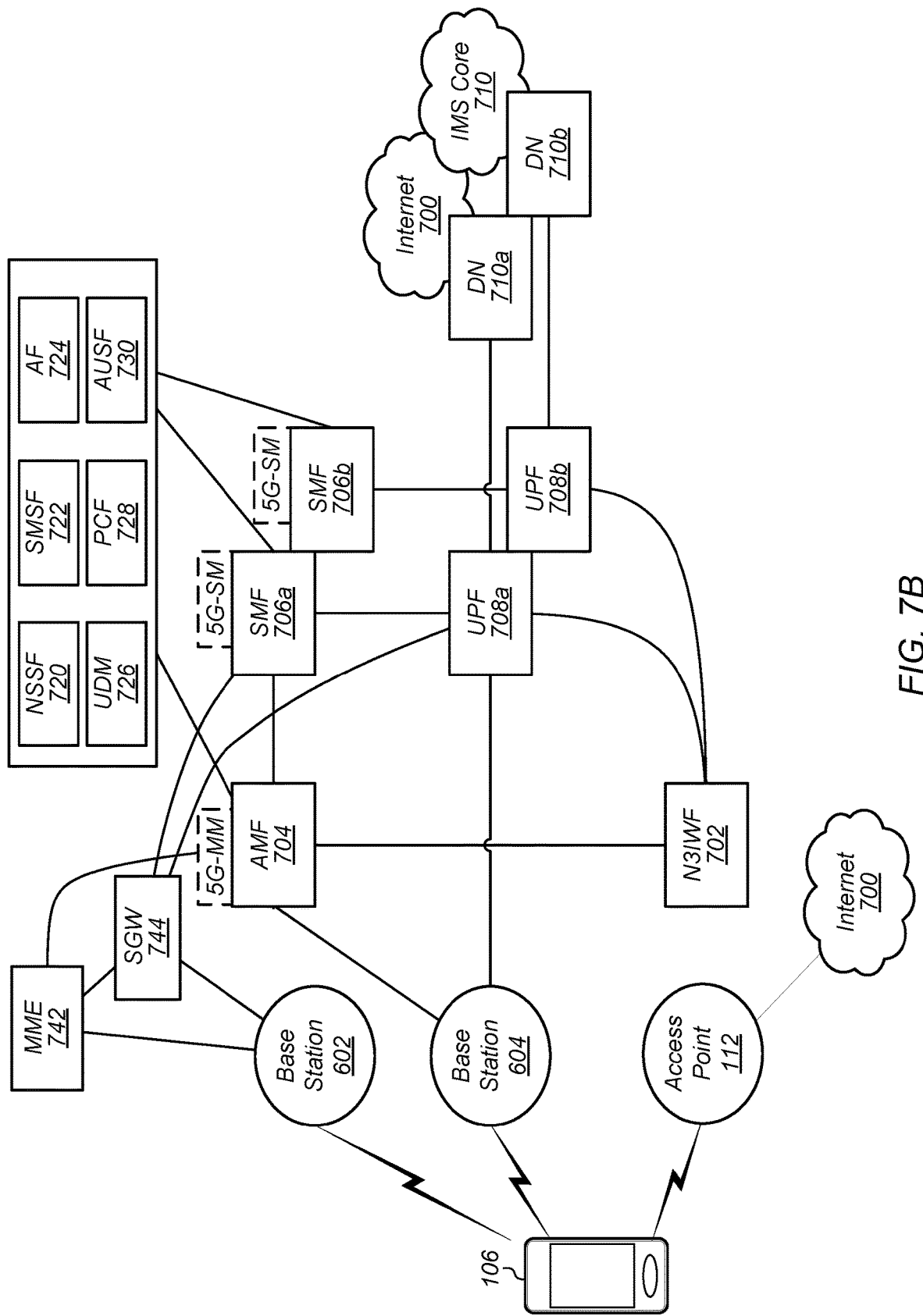
FIG. 7B illustrates an example of a 5G network architecture that incorporates both dual 3GPP (e.g., LTE/eLTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706a and the SMF 706b of the 5G CN. The AMF 706 may be connected to (or in communication with) the SMF 706a. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods to implement mechanisms for non-stand-alone unlicensed band cells that support single carrier capable UEs, e.g., as further described herein.

Figure 8:
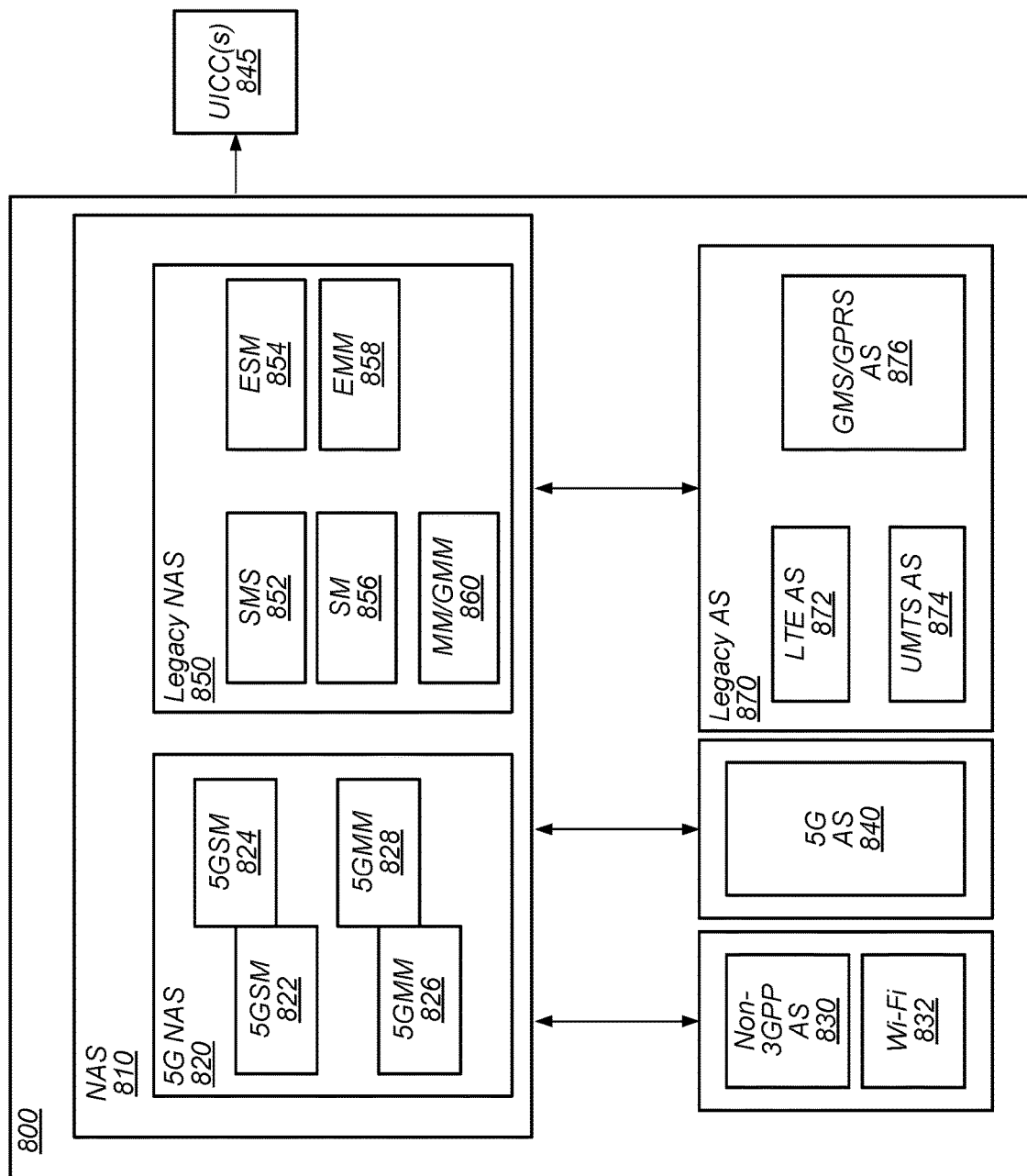
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods to implement mechanisms for non-stand-alone unlicensed band cells that support single carrier capable UEs, e.g., as further described herein.

5G NR Unlicensed Band Cell Access and Deployment

Figure 9:
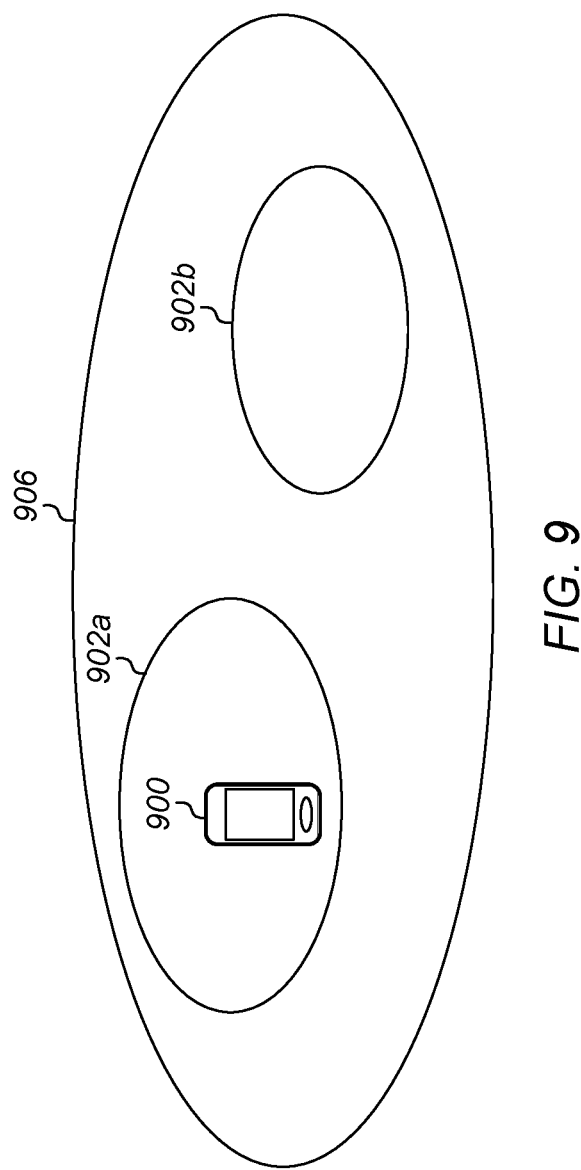
FIG. 9 illustrates a possible deployment of licensed and unlicensed band cells.

As noted above, 5G NR may allow interworking with unlicensed bands via Wi-Fi access (e.g., via a Wi-Fi access point). Thus, in some contemplated implementations, one or more unlicensed band cells (e.g., providing access to unlicensed bands) may be co-located within a licensed band cell (e.g., providing access to licensed bands). For example, as illustrated by FIG. 9, a device may, such as device 900, may be located in an unlicensed band cell 902a, which may be encompassed by a licensed band cell 906. In addition, licensed band cell 906 may also encompass unlicensed band cell 902b. In such scenarios, multiple deployments have been contemplated to allow the device 900 to access both the licensed band cell 906 and the unlicensed band cell 902a. For example, in one scenario, device 900 may use carrier aggregation between the licensed band cell 906 and the unlicensed band cell 902a. As another example, device 900 may connect to both the licensed band cell 906 and the unlicensed band cell 902a (e.g., dual connectivity). As a further example, the unlicensed band cell 902a may be a stand-alone cell and the device 900 may register with unlicensed band cell 902a to gain access to the unlicensed bands. As yet another example, a 5G NR cell may be implemented such that downlink connections use unlicensed bands and uplink connections use licensed bands. As another example, device 900 may connect to a legacy cell (e.g., LTE licensed bands) and the unlicensed band cell 902a (e.g., dual connectivity). However, for scenarios that would implement carrier aggregation and/or dual connectivity, a device that is not capable of carrier aggregation would not be able to access the unlicensed bands. In other words, a device with single carrier capability would not be able to access the unlicensed bands. Additionally, for other scenarios (e.g., stand-alone and/or downlink in unlicensed bands) the unlicensed band cell may be required to support idle reference signals, system information transmissions, and/or paging transmissions. However, supporting such channel access mechanisms may require compliance with certain regulations and listen before talk mechanisms (which may delay access to the unlicensed bands) may be applied to such channel access transmissions leading to additional design complexity. Further, transmissions for idle mode (e.g., SI and/or paging transmissions) may increase signaling overhead in the unlicensed band cell and increase collision probabilities.

Embodiments described herein provided mechanisms for deployment of non-stand-alone unlicensed band cells that support single carrier capable UEs (e.g., such as UE 106). In some embodiments, support for single carrier capable UEs may be limited to UEs working in a connected mode. In some embodiments, an unlicensed band cell may not support paging and system information transmission. In some embodiments, an unlicensed band cell may support RACH procedures. In some embodiments, a UE, such as UE 106, may camp on a licensed band cell in an IDLE/INACTIVE state and may access an unlicensed band cell upon entering a CONNECTED state. In some embodiments, a UE, such as UE 106 may access a licensed band cell and the licensed band cell may redirect the UE to connect to the unlicensed band cell. In some embodiments, the redirection (or switching) of the UE to the unlicensed band cell may be based on any, any combination of, and/or all of a network policy, network load (and/or network traffic conditions), a capability of the UE, and/or position (e.g., geographic location) of the UE. In some embodiments, a UE, such as UE 106 may (also or additionally) access an unlicensed band cell directly, e.g., without intervention and/or support from a licensed band cell.

Figure 10:
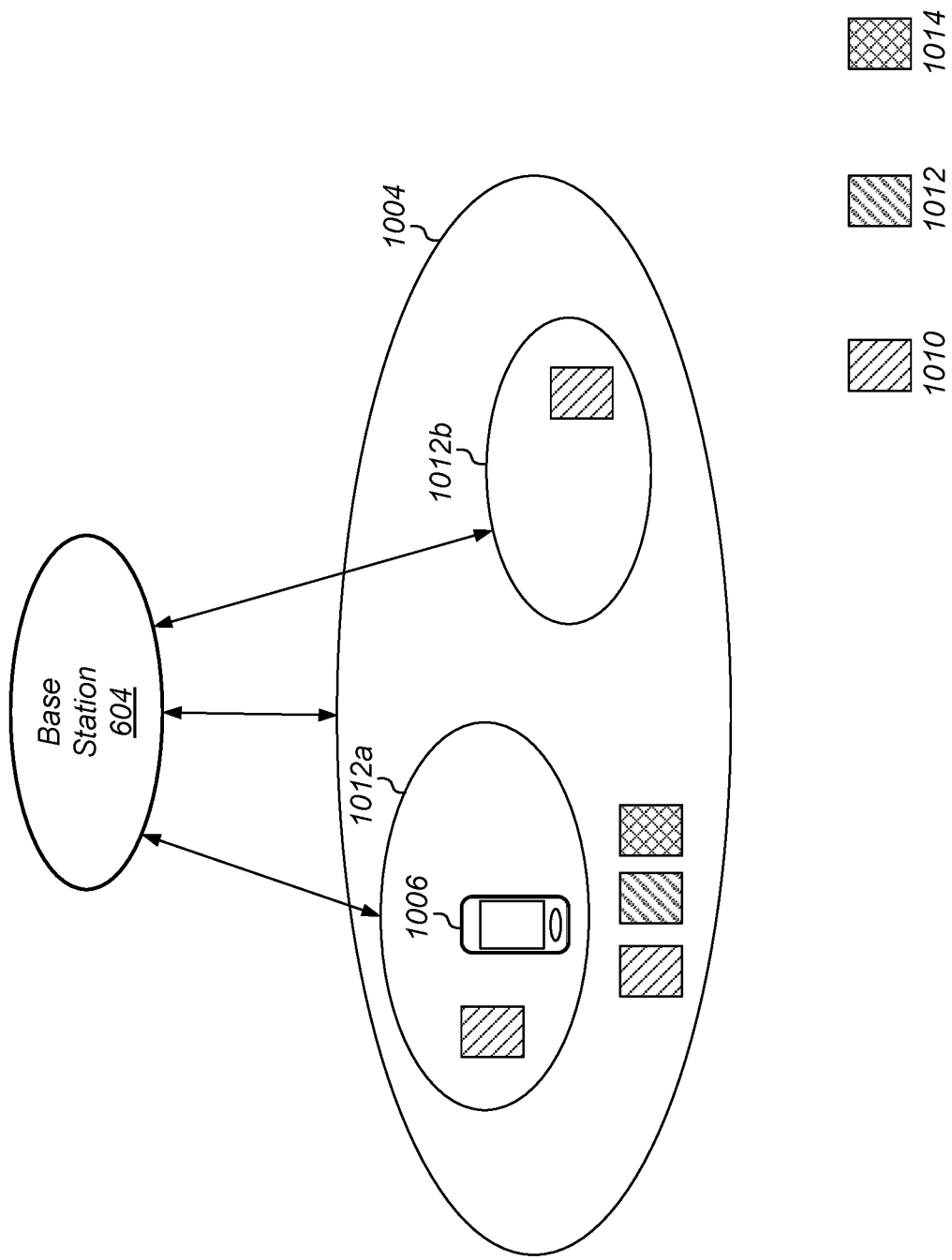
FIG. 10 illustrates a possible deployment of licensed and unlicensed band cells, according to some embodiments.

For example, FIG. 10 illustrates a possible deployment of licensed and unlicensed band cells, according to some embodiments. As shown, base station 604 may be in communication (or supporting) licensed band cell 1004 as well as unlicensed band cells 1012a and 1012b. Note that licensed band cell 1004 may provide connections in a licensed spectrum whereas unlicensed band cells 1012a and 1012b may provide connections in an unlicensed spectrum. Further, UE 1006, which may be a UE 106, may be located within unlicensed band cell 1012a as well as licensed band cell 1004. Licensed band cell 1004 may broadcast master information block (MIB) 1010, cell RMSI 1012, and other system information blocks (SIBs) 1014. Similarly, unlicensed band cells 1012a and 1012b may also broadcast respective MIBs 1010. Thus, the UE 1006 may camp on the licensed band cell 1004 (e.g., via communications with base station 604) and may remain in an idle or inactive state. Upon entering a connected state, licensed band cell 1004 may direct (or redirect) the UE 1006 to unlicensed band cell 1012a.

Figure 11A:
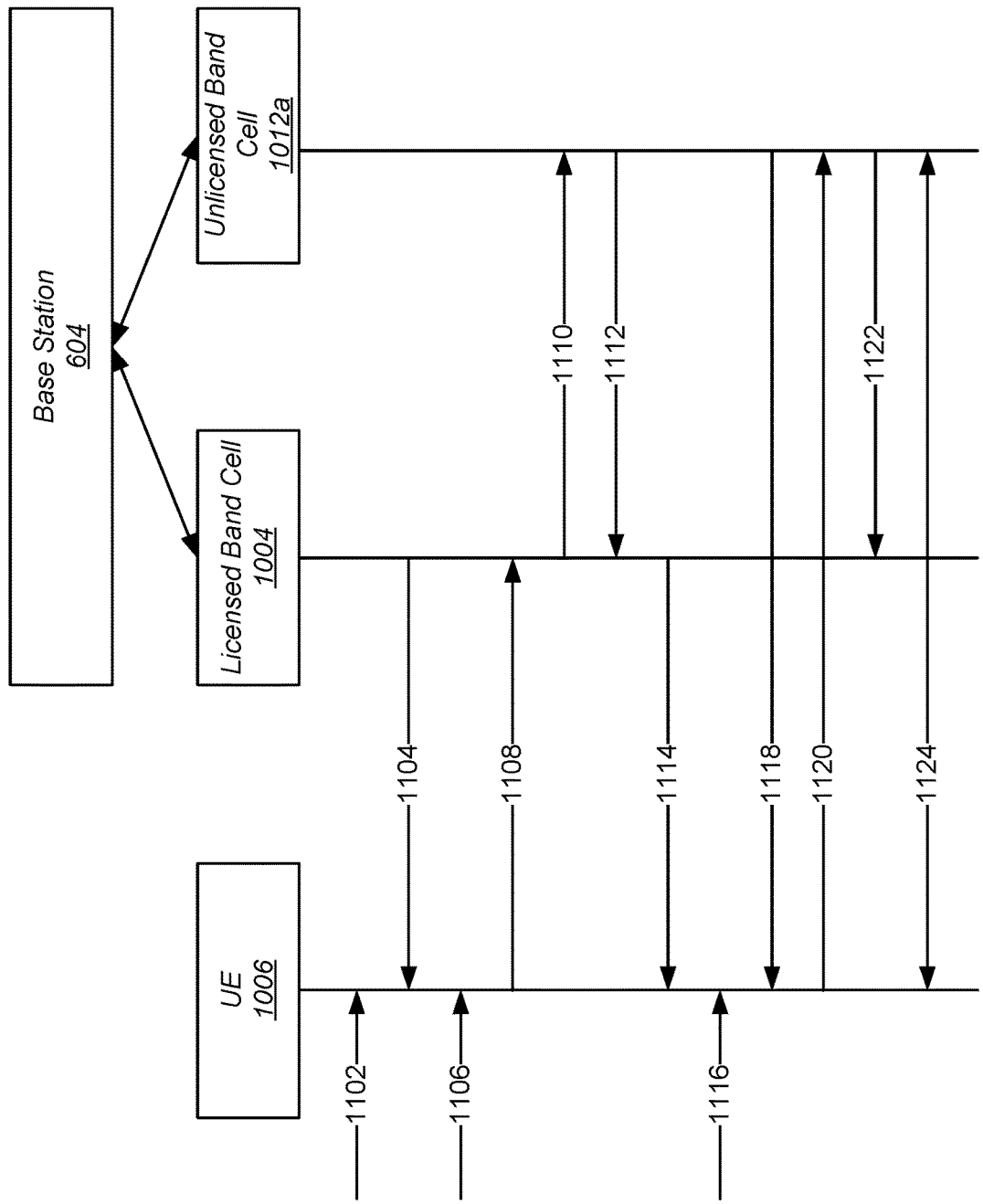
FIGS. 11A and 11B illustrate signaling diagrams of examples of signaling for a licensed band cell to redirect a user equipment device to an unlicensed band cell, according to some embodiments.
Figure 11B:
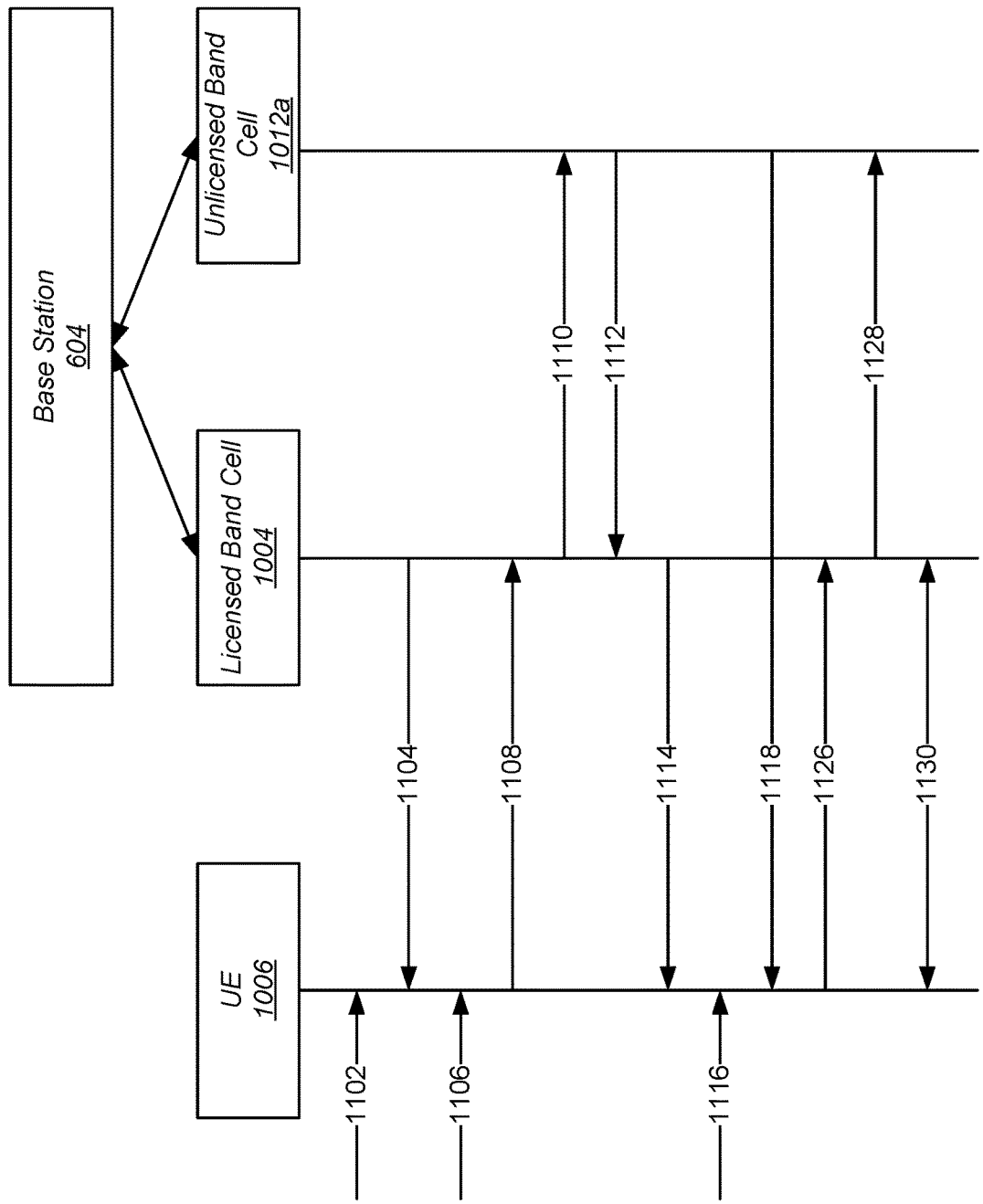

FIGS. 11A and 11B illustrate signaling diagrams of examples of signaling for a licensed band cell to redirect a user equipment device to an unlicensed band cell, according to some embodiments. The signaling shown in FIGS. 11A and 11B may be used in conjunction with any of the systems or devices shown in the above Figures, among other devices. In various embodiments, some of the signaling shown may be performed concurrently, in a different order than shown, or may be omitted. Additional signaling may also be performed as desired. As shown, the signaling may flow as follows.

As shown in FIG. 11A, at 1102, a UE, such as UE 1006 may camp (e.g., via a RACH procedure) on a licensed band cell, such as licensed band cell 1004. Licensed band cell 1004 may be supported by a base station, such as base station 604 (which may be a gNB, e.g., a 5G NR base station as described above). At 1104, licensed band cell 1004 may broadcast cell information, e.g., as described above. Based on the broadcasted cell information, at 1106 the UE 1006 may decide to access the network and may, at 1108, transmit an RRC connection request and/or an RRC resume connection request to the licensed band cell 1004. At 1110, the licensed band cell 1004 may transmit a request to switch the UE 1006 to an unlicensed band cell, such as unlicensed band cell 1012a. In some embodiments, the redirection (or switching) of the UE to the unlicensed band cell may be based on any, any combination of, and/or all of a network policy, network load (and/or network traffic conditions), a capability of the UE, and/or position (e.g., geographic location) of the UE. At 1112, unlicensed band cell 1012a may transmit a cell configuration to licensed band cell 1004. Note that unlicensed band cell 1012a may also be supported by base station 604. Upon receipt of the unlicensed band cell configuration, the licensed band cell 1004 may, at 1114, transmit an RRC setup message to the UE 1006. In some embodiments, the RRC setup message may include an indication of a switch to the unlicensed band cell (e.g., unlicensed band cell 1012a). In some embodiments, the RRC setup message may also include an identifier for the unlicensed band cell (e.g., a U-Cell ID), the unlicensed band cell's cell radio network temporary identifier (C-RNTI) as well as the unlicensed band cell's configuration requirements for CONNECTED mode. Upon receipt of the RRC setup message, the UE 1006 may, at 1116, acquire downlink timing from the unlicensed band cell 1012a and also perform a radio quality check at 1118. Further, upon confirming the radio quality and/or downlink timing, the UE 1006 may, at 1120, transmit an RRC connection complete message to the unlicensed band cell 1012a. In response, the unlicensed band cell 1012a may transmit, at 1112, a confirmation of the switch of the UE 1006 to the licensed band cell 1004. At 1124, the UE 1006 and the unlicensed band cell 1012a may then commence data transmissions.

As shown in FIG. 11B, at 1102, a UE, such as UE 1006 may camp on a licensed band cell, such as licensed band cell 1004. Licensed band cell 1004 may be supported by a base station, such as base station 604 (which may be a gNB, e.g., a 5G NR base station as described above). At 1104, licensed band cell 1004 may broadcast cell information, e.g., as described above. Based on the broadcasted cell information, the UE 1006 may decide, at 1106, to access the network and may transmit, at 1108, an RRC connection request and/or an RRC resume connection request to the licensed band cell 1004. At 1110, the licensed band cell 1004 may transmit a request to switch the UE 1006 to an unlicensed band cell such as unlicensed band cell 1012a. In some embodiments, the redirection (or switching) of the UE to the unlicensed band cell may be based on any, any combination of, and/or all of a network policy, network load (and/or network traffic conditions), a capability of the UE, and/or position (e.g., geographic location) of the UE. At 1112, unlicensed band cell 1012*a* may transmit a cell configuration to licensed band cell 1004. Note that unlicensed band cell 1012*a* may also be supported by base station 604. Upon receipt of the unlicensed band cell configuration, the licensed band cell 1004 may transmit, 1114, an RRC setup message to the UE 1006. In some embodiments, the RRC setup message may include an indication of a switch to the unlicensed band cell (e.g., unlicensed band cell 1012*a*). In some embodiments, the RRC setup message may also include an identifier for the unlicensed band cell (e.g., a U-Cell ID), the unlicensed band cell's cell radio network temporary identifier (C-RNTI) as well as the unlicensed band cell's configuration requirements for CONNECTED mode. Upon receipt of the RRC setup message, the UE 1006 may, at 1116, acquire downlink timing from the unlicensed band cell 1012*a* and also perform a radio quality check at 1118. Further, upon confirming that the radio quality and/or downlink timing are not sufficient for transmissions, the UE 1006 may transmit, at 1126, an RRC connection failure message to the licensed band cell 1012*a*. The RRC connection failure message may indicate that the connection to unlicensed band cell 1012*a* failed. In some embodiments, the RRC connection failure message may indicate a cause of the failure, e.g., unlicensed band cell not found, unlicensed band cell found but signaling timeout, and so forth. In response, the licensed band cell 1004 may transmit, at 1128, an indication of failure of the switch of the UE to the unlicensed band cell 1012*a*. The UE 1006 and the licensed band cell 1004 may then commence data transmissions at 1130.

Figure 12A:
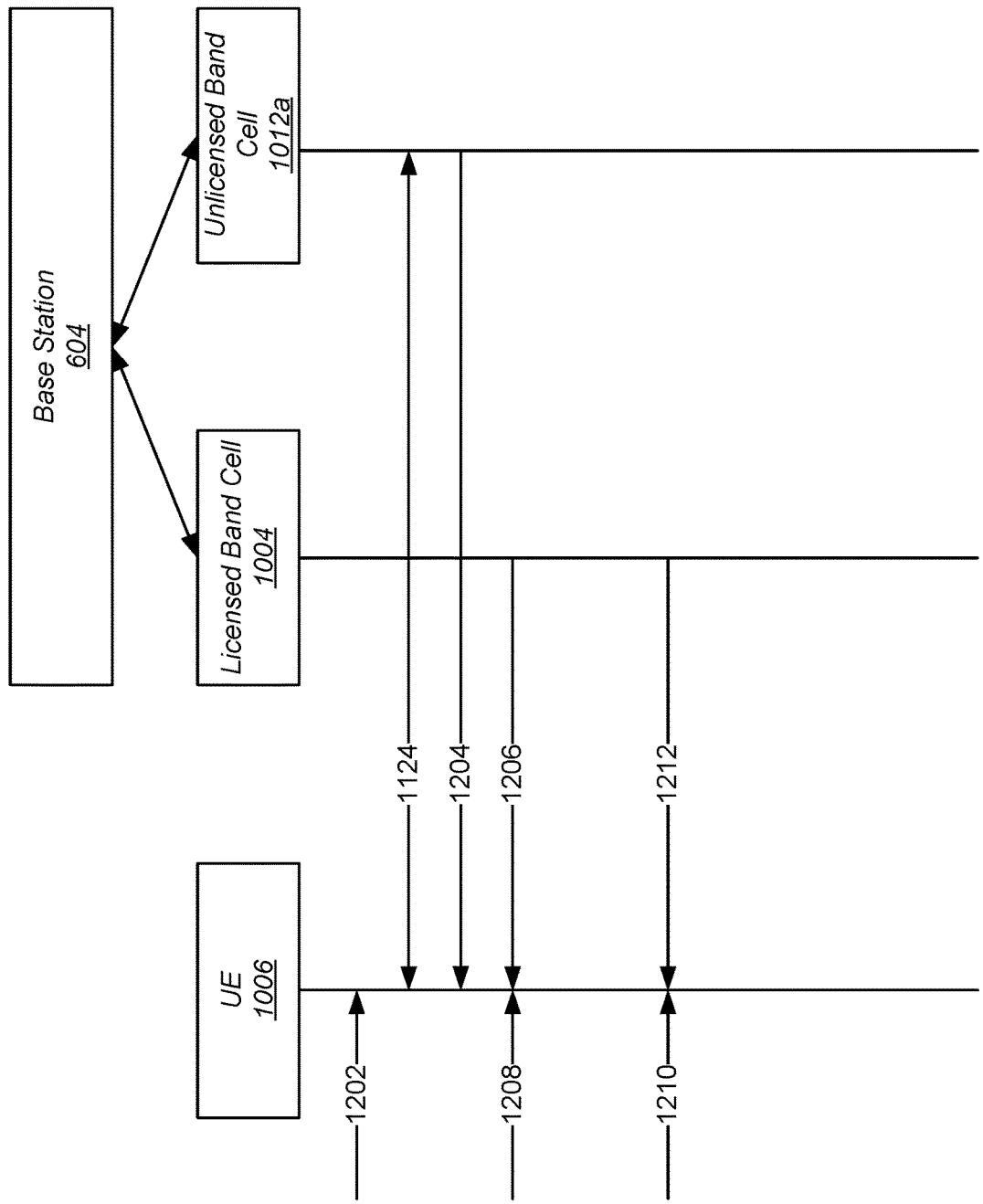
FIGS. 12A and 12B illustrate signaling diagrams of examples of signaling for an unlicensed band cell to release a user equipment device to a licensed band cell, according to some embodiments.
Figure 12B:
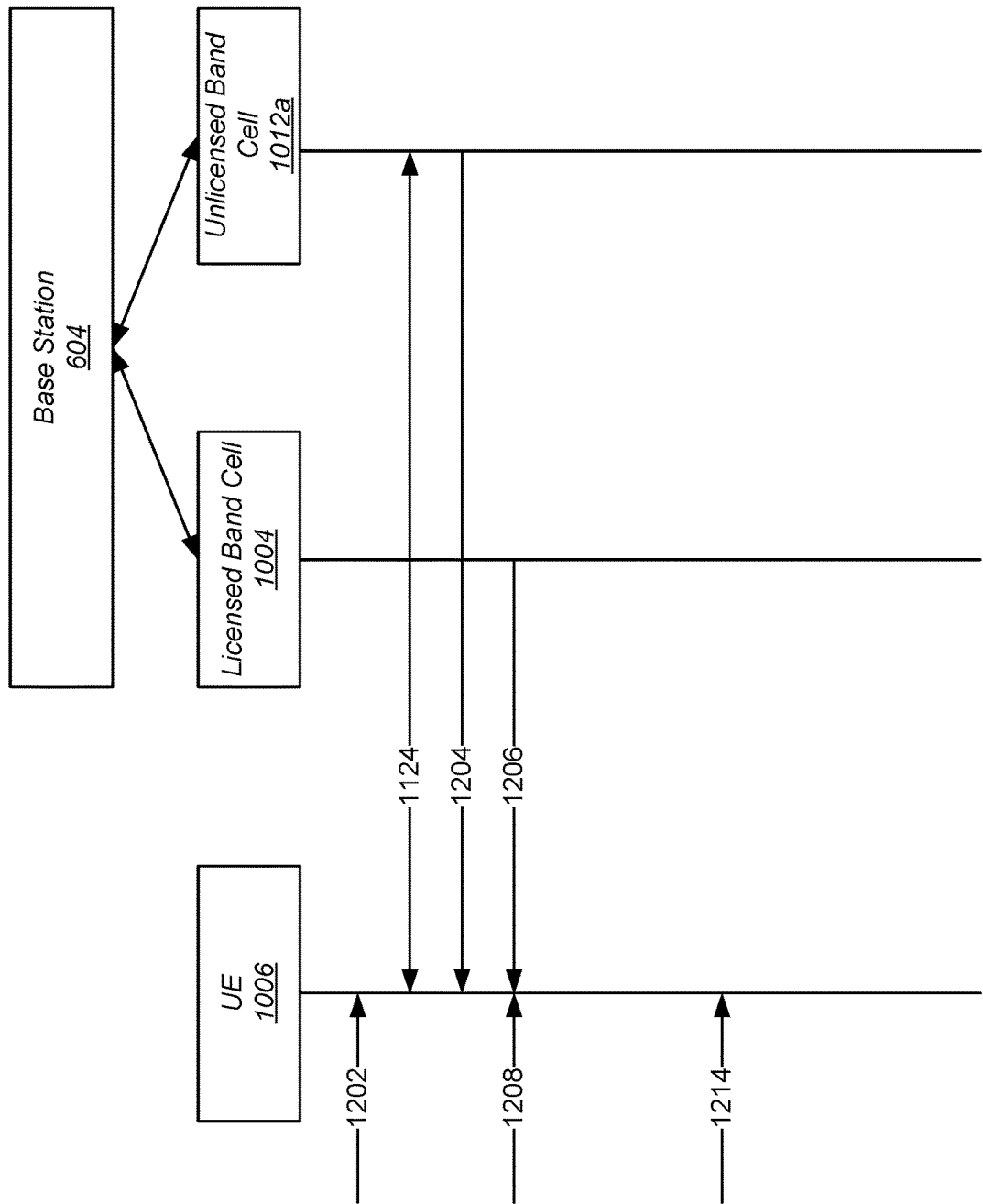

FIGS. 12A and 12B illustrate signaling diagrams of examples of signaling for an unlicensed band cell to release a user equipment device to a licensed band cell, according to some embodiments. The signaling shown in FIGS. 12A and 12B may be used in conjunction with any of the systems or devices shown in the above Figures, among other devices. In various embodiments, some of the signaling shown may be performed concurrently, in a different order than shown, or may be omitted. Additional signaling may also be performed as desired. As shown, the signaling may flow as follows.

As shown in FIG. 12A, a UE, such as UE 1006, may be, at 1202, camped on an unlicensed band cell, such as unlicensed band cell 1012*a* and may be performing data transmissions 1124 with the unlicensed band cell 1012*a*. Note that unlicensed band cell 1012*a* may also be supported by base station 604 (which may be a gNB, e.g., a 5G NR base station as described above). The unlicensed band cell 1012*a* may transmit, at 1204, an RRC connection release to the UE 1006. The RRC connection release may include an indication or identifier for licensed band cell 1004, which may also be supported by base station 604. The UE 1006 may, at 1206, receive a reference signal from licensed band cell 1004. At 1208, the UE 1006 may use the reference signal to acquire timing and check radio quality on the licensed band cell 1004. At 1210, the UE 1006 may camp (e.g., camping criteria are satisfied) on licensed band cell 1004 and monitor paging and/or system information received from broadcasts by licensed band cell 1004 at 1212.

As shown in FIG. 12B, a UE, such as UE 1006, may be, at 1202, camped on an unlicensed band cell, such as unlicensed band cell 1012*a* and may be performing data transmissions 1124 with the unlicensed band cell 1012*a*. Note that unlicensed band cell 1012*a* may also be supported by base station 604 (which may be a gNB, e.g., a 5G NR base station as described above). The unlicensed band cell 1012*a* may transmit, at 1204, an RRC connection release to the UE 1006. The RRC connection release may include an indication or identifier for licensed band cell 1004, which may also be supported by base station 604. The UE 1006 may, at 1206, receive a reference signal from licensed band cell 1004. At 1208, the UE 1006 may use the reference signal to acquire timing and check radio quality. Upon confirming that the radio quality and/or downlink timing are not sufficient for transmissions, the UE 1006 may initiate cell reselection at 1214. In some embodiments, the cell reselection and/or a new cell selection may not be restricted to a licensed band cell on the 5G NR RAT and may include eLTE and/or any legacy RAT such as LTE-A, LTE, WCDMA, GSM, and so forth.

Figure 13:
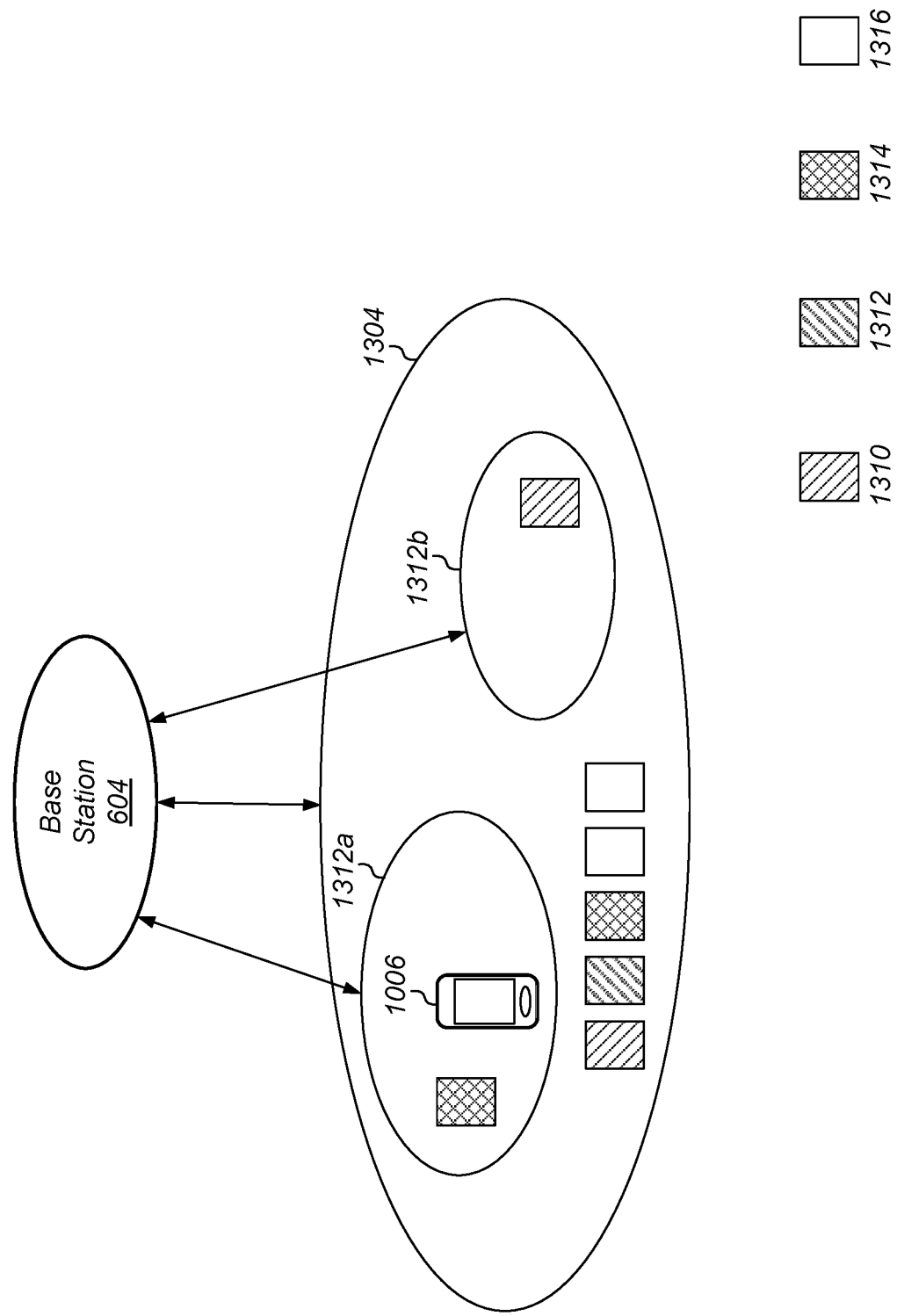
FIG. 13 illustrates another possible deployment of licensed and unlicensed band cells, according to some embodiments.

As another example, FIG. 13 illustrates another possible deployment of licensed and unlicensed band cells, according to some embodiments. As shown, base station 604 may be in communication (or supporting) licensed band cell 1304 but not unlicensed band cells 1312*a* and 1312*b*. Note that licensed band cell 1304 may provide connections in a licensed spectrum whereas unlicensed band cells 1312*a* and 1312*b* may provide connections in an unlicensed spectrum. Further, UE 1006, which may be a UE 106, may be located within unlicensed band cell 1312*a* as well as licensed band cell 1304. Licensed band cell 1304 may broadcast master information block (MIB) 1310, cell RMSI 1312, other system information blocks (SIBs) 1314, as well as cell RMSIs 1316 associated with unlicensed band cells (e.g., unlicensed band cells 1312*a* and 1312*b*) within licensed band cell 1304. Similarly, unlicensed band cells 1312*a* and 1312*b* may also broadcast respective MIBs 1310 and cell RMSIs 1316. Thus, the UE 1006 may camp on the licensed band cell 1304 (e.g., via communications with base station 604) and may remain in an idle or inactive state. In some embodiments, the UE 1006 may detect a suitable unlicensed band cell for access. Further, upon initiating access with the network, the UE 1006 may detect an unlicensed band cell (e.g., unlicensed band cell 1312) with sufficient signal quality and initiate access with the detected unlicensed band cell.

Figure 14:
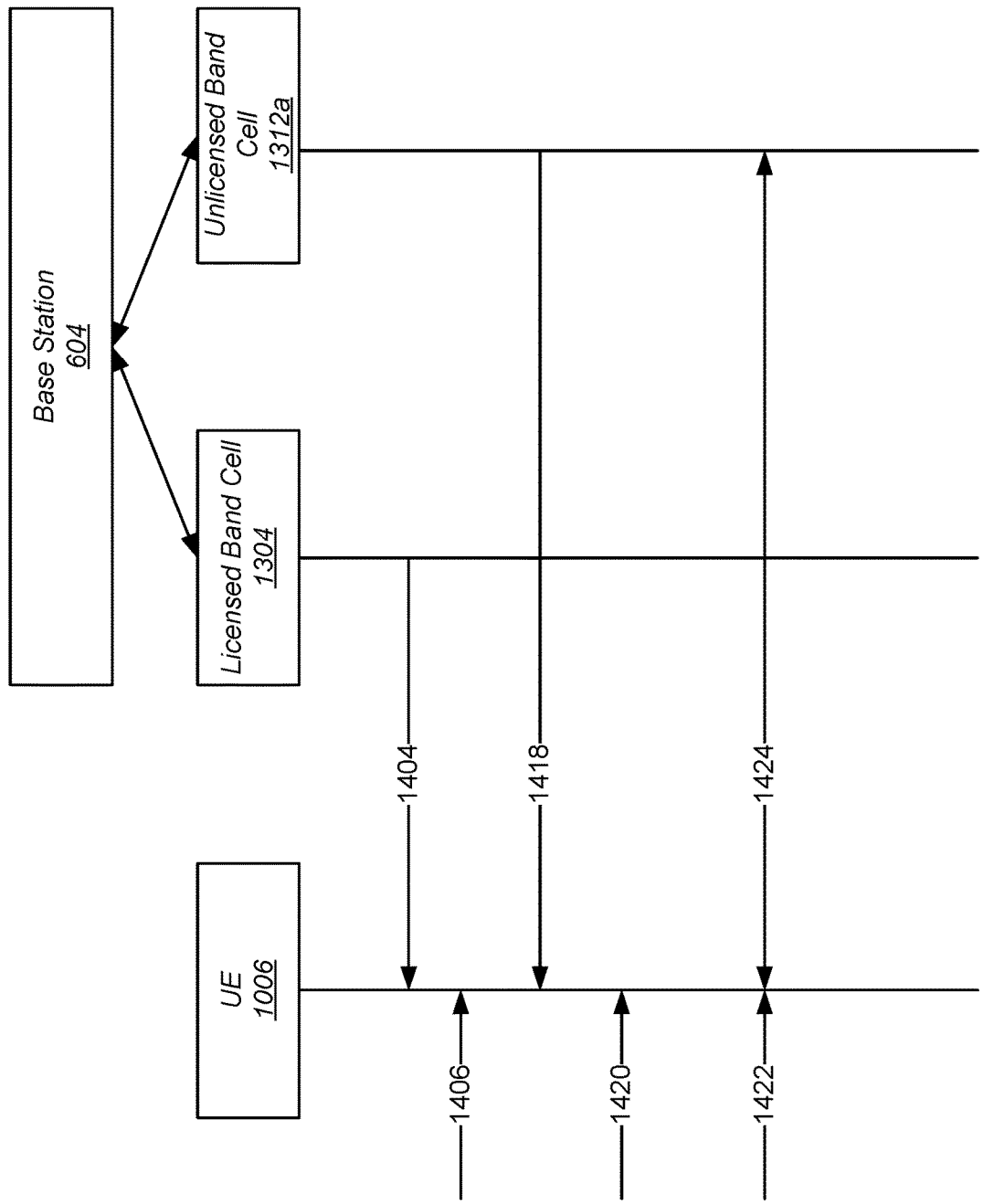
FIG. 14 illustrates a signaling diagram of example of signaling for a user equipment device to initiate access to an unlicensed band cell, according to some embodiments.

FIG. 14 illustrates a signaling diagram of example of signaling for a user equipment device to initiate access to an unlicensed band cell, according to some embodiments. The signaling shown in FIG. 14 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, the signaling may flow as follows.

As shown, a UE, such as UE 1006, may, at 1404, receive a broadcast message from a licensed band cell, such as licensed band cell 1304. At 1406, based on information in or indicated by the broadcast message, the UE 1006 may determine to access the network. At 1418, the UE 1006 may receive a reference signal for unlicensed band cell 1312*a*. At 1420, the UE 1006 may determine signal quality based on the received reference signal. At 1422, in response to determining that the signal quality is sufficient (e.g., greater than a threshold), the UE 1006 may initiate access with the unlicensed band cell 1312*a*. The UE 1006 and the unlicensed band cell 1312*a* may then commence data transmissions at 1424.

Figure 15A:
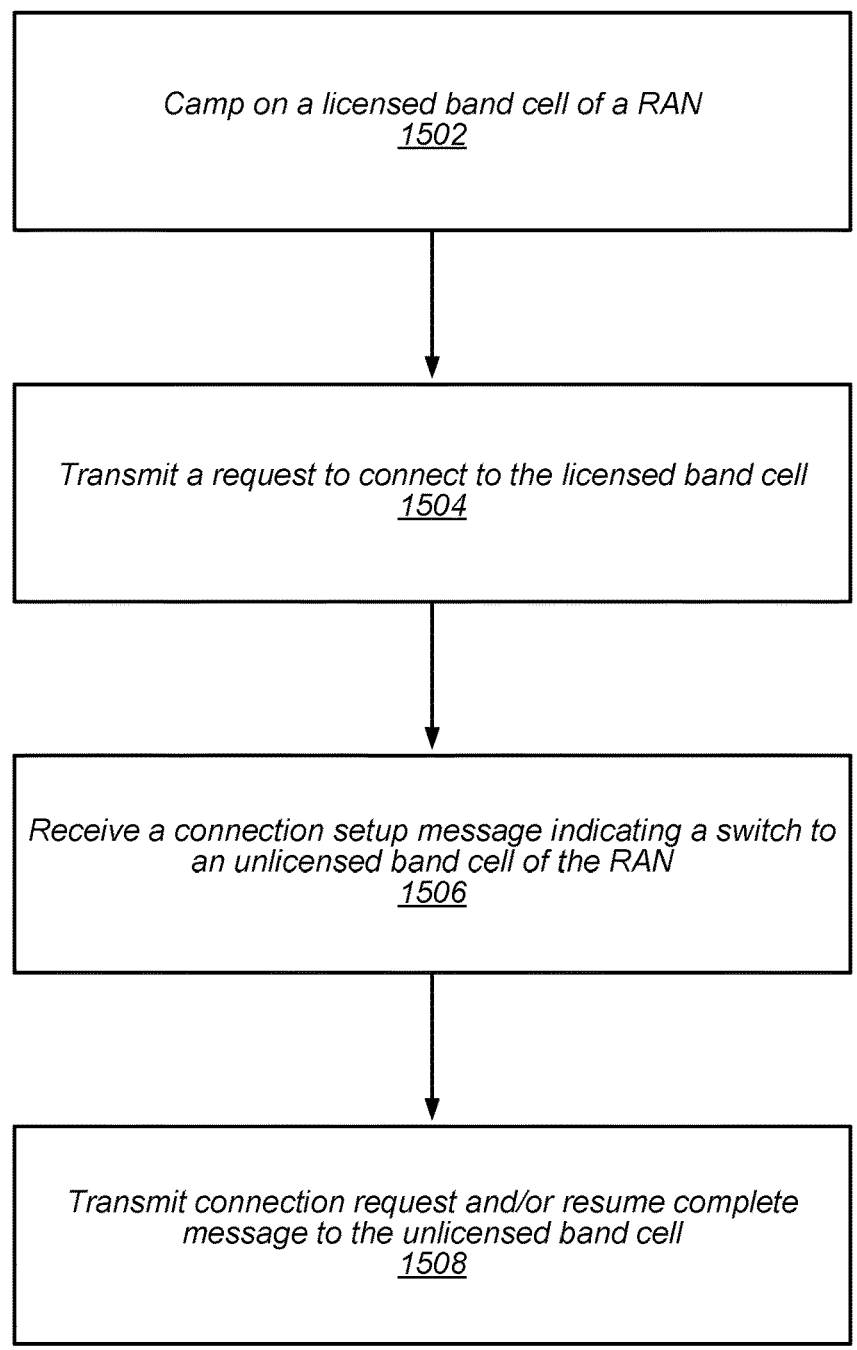
FIG. 15A illustrates a block diagram of an example of a method for a UE to switch from a licensed band cell to an unlicensed band cell, according to some embodiments.

FIG. 15A illustrates a block diagram of an example of a method for a UE to switch from a licensed band cell to an unlicensed band cell, according to some embodiments. The method shown in FIG. 15A may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1502, a UE, such as UE 106, may camp on a licensed band cell, such as licensed band cell 1004, of a radio access network (RAN). In some embodiments, the RAN may operate according to Fifth Generation New Radio (5G NR) protocol. In some embodiments, the RAN may operate according E-UTRA, e.g., LTE and/or LTE-A, protocol.

At 1504, the UE may transmit a request to connect to the licensed band cell. In some embodiments, the request may be transmitted in response to receiving first information from the licensed band cell. In some embodiments, a request to connect/resume may include a radio resource control connection/resume request. In some embodiments, the connection setup/resume message may indicate at least one of (and/or any, any combination of, and/or all of) an identifier for the unlicensed band cell, a cell radio network temporary identifier (C-RNTI) for the unlicensed band cell, and/or configuration requirements for CONNECTED mode on the unlicensed band cell.

At 1506, the UE may receive, from the licensed band cell, a connection setup message indicating that the UE switch to an unlicensed band cell, such as unlicensed band cell 1012a, of the RAN. In some embodiments, a base station, such as base station 604 may support both the licensed band cell and the unlicensed band cell. In some embodiments, switching the UE to the unlicensed band cell may be based on at least one of (and/or any, any combination of, and/or all of) network policy, network load and/or network traffic conditions, a capability of the UE, and/or a position (or geographic location) of the UE, e.g., relative to the unlicensed band cell.

At 1508, the UE may transmit a connection message and/or a resume complete message to the unlicensed band cell. In some embodiments, the connection message and/or resume complete message may be transmitted in response to confirming based, at least in part on a reference signal received from the unlicensed band cell, radio quality and/or downlink timing of the unlicensed band cell. In some embodiments, the UE may perform data transmissions with the unlicensed band cell. In some embodiments, the connection/resume complete message may include a radio resource control connection complete message.

In some embodiments, the UE may transmit a connection message and/or a resume complete message to the licensed band cell in response to confirming, based at least in part of the reference signal, radio quality and/or downlink timing of the unlicensed band cell is not satisfactory. In such embodiments, the UE may perform data transmissions with the licensed band cell. In some embodiments, the connection/resume complete message may include a radio resource control connection complete message.

In some embodiments, the UE may receive, from the unlicensed band cell, a connection release message. Additionally, the UE may receive a reference signal from the licensed band cell and determine, based at least in part on the reference signal, to camp on the licensed band cell. In some embodiments, the connection release message may include an indication of redirecting the UE to licensed band cell and may optionally include an identifier of the licensed band cell. In some embodiments, the UE may determine that the licensed band cell is not suitable for camping and may perform a cell selection (or reselection) procedure. In some embodiments, the cell selection (or reselection) procedure may be limited on (or to) the licensed band.

Figure 15B:
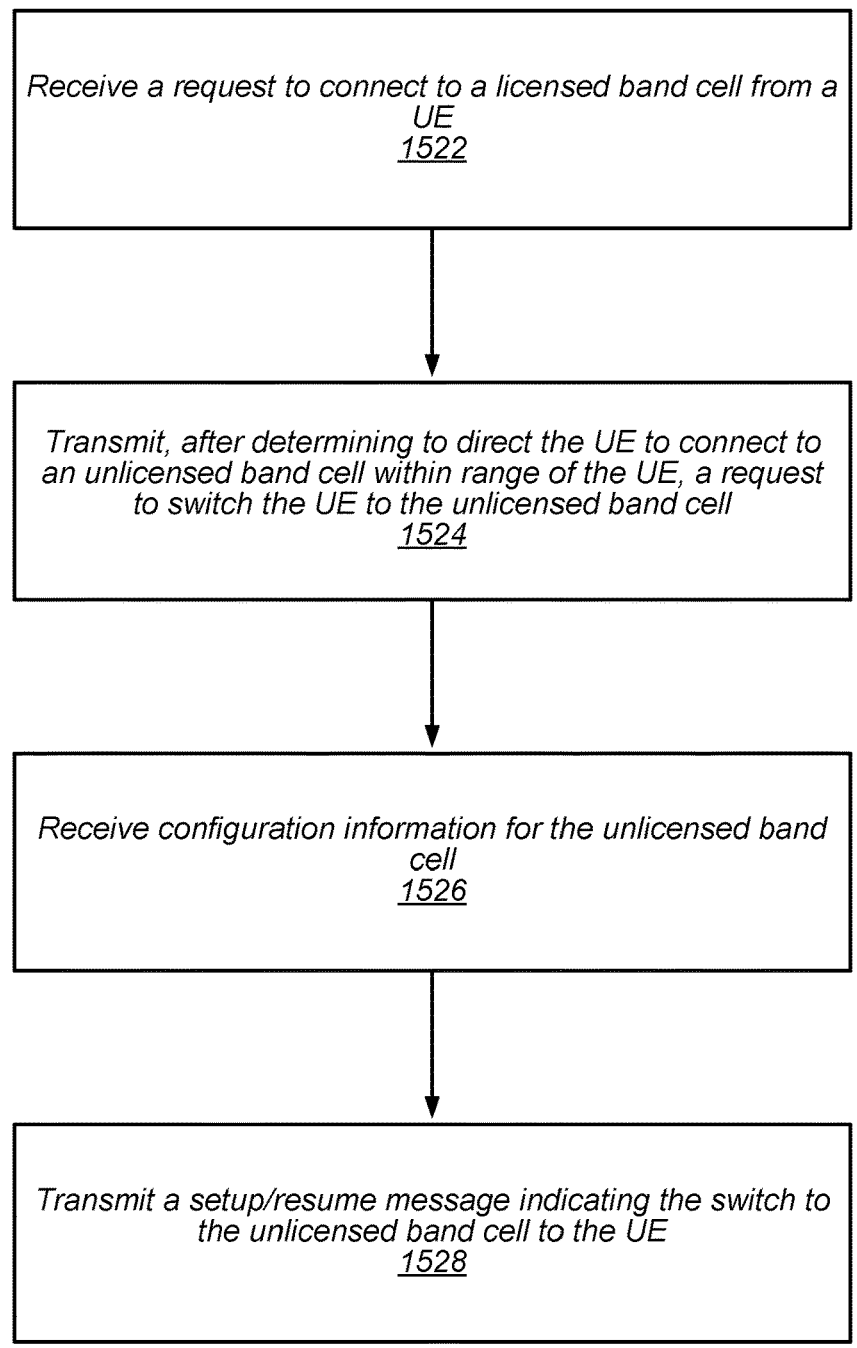
FIG. 15B illustrates a block diagram of an example of a method for a network to switch a UE from a licensed band cell to an unlicensed band cell, according to some embodiments.

FIG. 15B illustrates a block diagram of an example of a method for a network to switch a UE from a licensed band cell to an unlicensed band cell, according to some embodiments. The method shown in FIG. 15B may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1522, a network entity, such as licensed band cell 1004 and/or base station 604, may receive a request to connect to a licensed band cell from a user equipment device (UE), such as UE 106. In some embodiments, the network entity may broadcast cell information and the request to connect may be responsive to the UE receiving the cell information. In some embodiments, base station may operate according to Fifth Generation New Radio (5G NR) protocol. In some embodiments, the base station may operate according E-UTRA, e.g., LTE and/or LTE-A, protocol. In some embodiments, the request to connect may include a radio resource control connection request.

At 1524, the network entity may transmit, after determining to direct the UE to connect to an unlicensed band cell within range of the UE, a request to switch the UE to the unlicensed band cell, such as unlicensed band cell 1006. In some embodiments, a base station, such as base station 604, may support the licensed band cell and the unlicensed band cell. In some embodiments, switching the UE to the unlicensed band cell may be based on at least one of (and/or any, any combination of, and/or all of) network policy, network load and/or network traffic conditions, a capability of the UE, and/or a position (or geographic location) of the UE, e.g., relative to the unlicensed band cell.

At 1526, the network entity may receive, from the unlicensed band cell, configuration information for the unlicensed band cell. In some embodiments, the configuration information may include at least one of (and/or any, any combination of, and/or all of) an identifier for the unlicensed band cell, a cell radio network temporary identifier (C-RNTI) for the unlicensed band cell, and/or configuration requirements for CONNECTED mode on the unlicensed band cell.

At 1528, the network entity may transmit, to the UE, a setup/resume message indicating the switch to the unlicensed band cell to the UE. In some embodiments, the connection setup/resume message may indicate at least one of (and/or any, any combination of, and/or all of) the identifier for the unlicensed band cell, the cell radio network temporary identifier (C-RNTI) for the unlicensed band cell, and/or configuration requirements for CONNECTED mode on the unlicensed band cell.

In some embodiments, the network entity may receive, from the UE, a connection/resume complete message that may indicate a failure of the UE to connect to the unlicensed band cell. In such embodiments, the network entity may perform, with the UE, data transmissions via the licensed band cell.

Figure 16A:
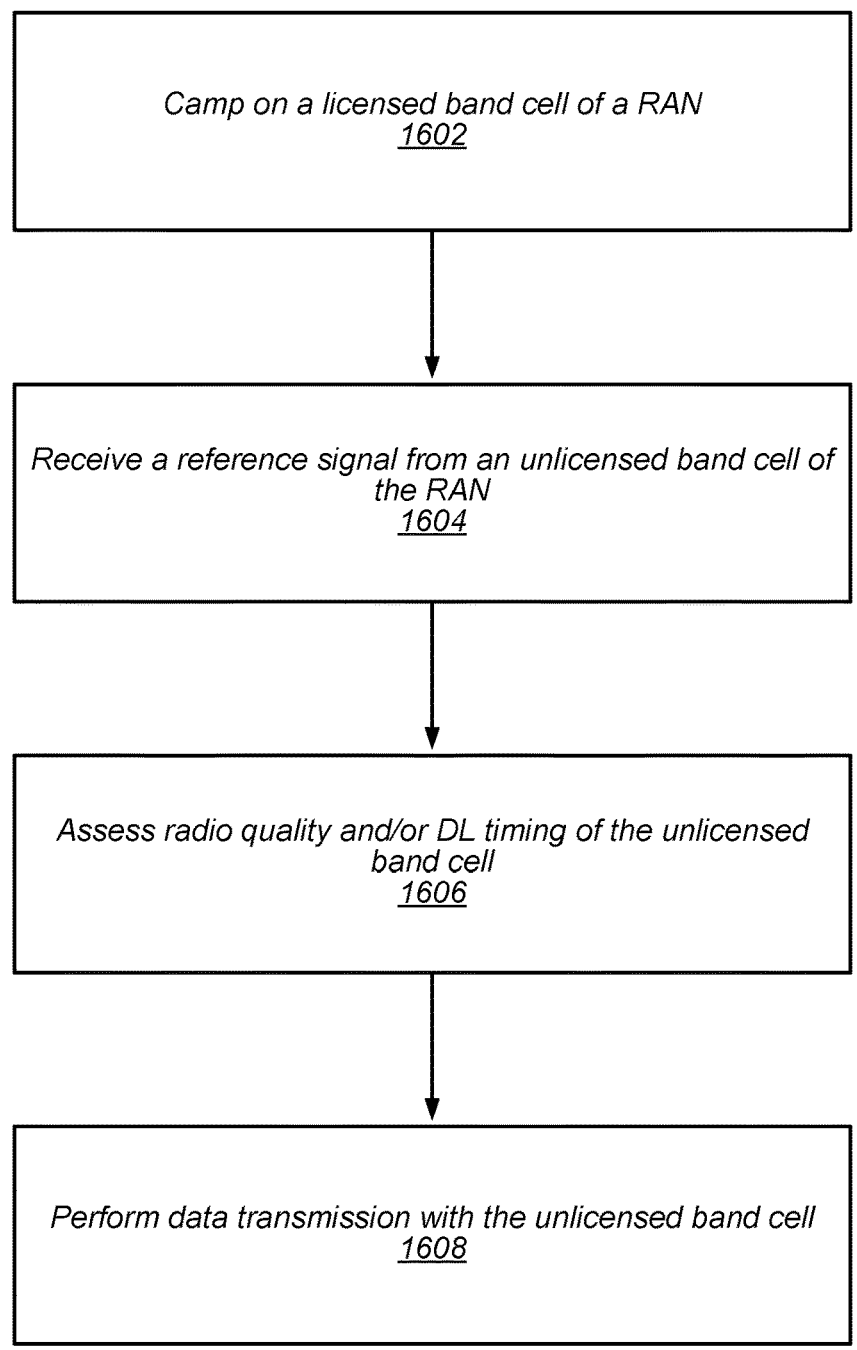
FIG. 16A illustrates a block diagram of another example of a method for a UE to switch from a licensed band cell to an unlicensed band cell, according to some embodiments.

FIG. 16A illustrates a block diagram of another example of a method for a UE to switch from a licensed band cell to an unlicensed band cell, according to some embodiments. The method shown in FIG. 16A may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1602, a UE, such as UE 106, may camp on a licensed band cell, such as licensed band cell 1004, of a radio access network (RAN). In some embodiments, the RAN may operate according to Fifth Generation New Radio (5G NR) protocol. In some embodiments, the RAN may operate according E-UTRA, e.g., LTE and/or LTE-A, protocol. In some embodiments, the UE may acquire paging and system information on the licensed band cell. In some embodiments, the UE may receive, from the licensed band cell while camping on the licensed band cell, the unlicensed band cell remaining minimum system information (RMSI).

At 1604, the UE may receive a reference signal from an unlicensed band cell, such as unlicensed band cell 1006. In some embodiments, the unlicensed band cell may be one of a plurality of unlicensed band cells. In such embodiments, the UE may receive reference signals from the plurality of unlicensed band cells and determine to access the unlicensed band cell based on a comparison of signal quality of the reference signal to a threshold.

At 1606, the UE may assess radio quality and/or downlink timing of the unlicensed band cell based, at least in part, on the reference signal. In some embodiments, the UE may transmit a connection message and/or a resume complete message to the unlicensed band cell. In some embodiments, the connection message and/or resume complete message may be transmitted in response to confirming based, at least in part on a reference signal received from the unlicensed band cell, radio quality and/or downlink timing of the unlicensed band cell. In some embodiments, the connection/resume complete message may include a radio resource control connection complete message.

At 1608, the UE may perform data transmissions with the unlicensed band cell. In some embodiments, the UE may receive, from the unlicensed band cell, a connection release message. Additionally, the UE may receive a reference signal from the licensed band cell and determine, based at least in part on the reference signal, to camp on the licensed band cell. In some embodiments, the connection release message may include an indication of redirecting the UE to licensed band cell and may optionally include an identifier of the licensed band cell. In some embodiments, the UE may determine that the licensed band cell is not suitable for camping and may perform a cell selection (or reselection) procedure. In some embodiments, the cell selection (or reselection) procedure may be limited on (or to) the licensed band.

Figure 16B:
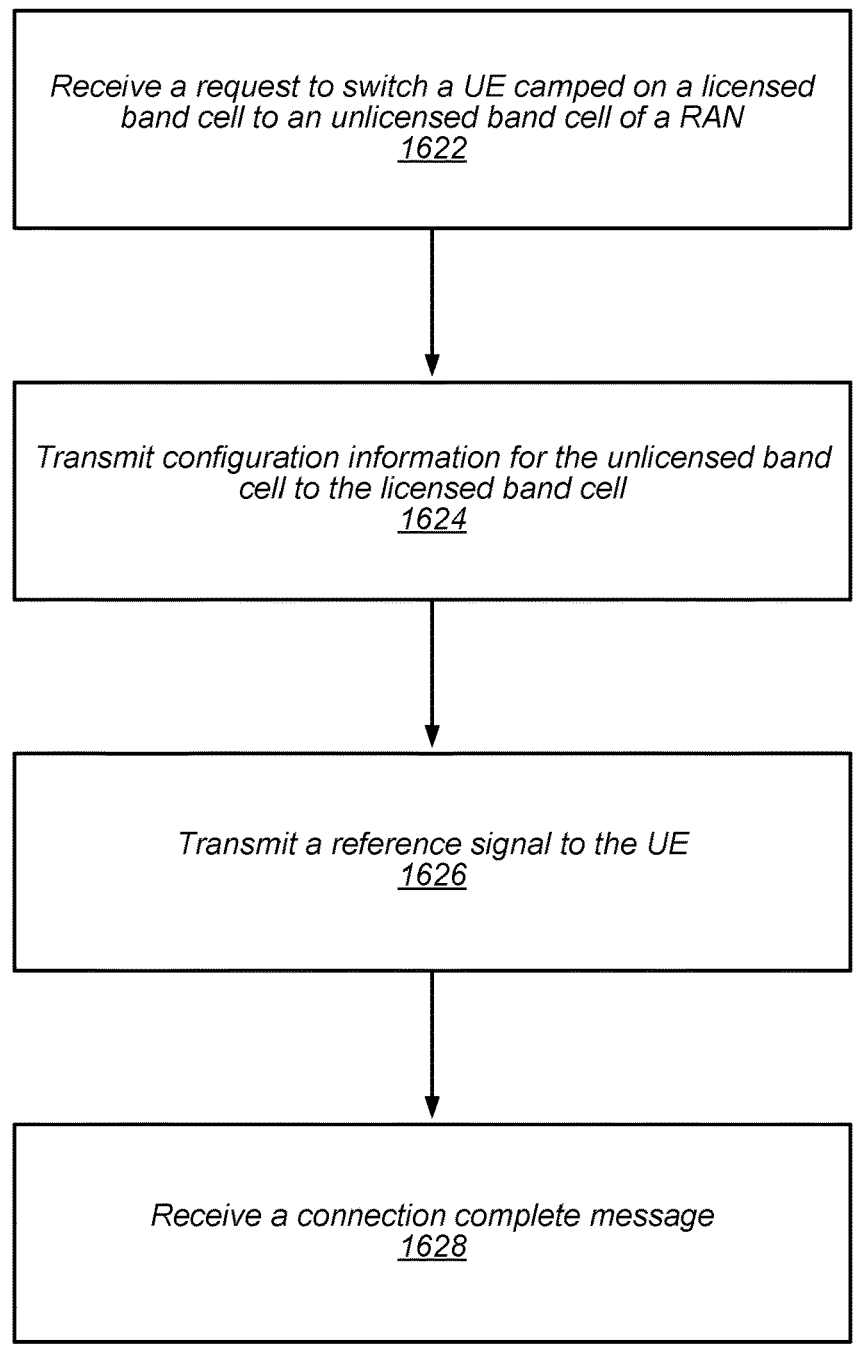
FIG. 16B illustrates a block diagram of another example of a method for a network to switch a UE from a licensed band cell to an unlicensed band cell, according to some embodiments.

FIG. 16B illustrates a block diagram of another example of a method for a network to switch a UE from a licensed band cell to an unlicensed band cell, according to some embodiments. The method shown in FIG. 16B may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1622, a network entity, such as unlicensed band cell 1006 and/or base station 604, may receive, from a licensed band cell, such as licensed band cell 1004, a request to switch a UE, such as UE 106, camped on the licensed band to the unlicensed band cell. In some embodiments, the base station may support the unlicensed band cell and the licensed band cell. In some embodiments, base station may operate according to Fifth Generation New Radio (5G NR) protocol. In some embodiments, the base station may operate according E-UTRA, e.g., LTE and/or LTE-A, protocol. In some embodiments, the request to connect may include a radio resource control connection request. In some embodiments, switching the UE to the unlicensed band cell may be based on at least one of (and/or any, any combination of, and/or all of) network policy, network load and/or network traffic conditions, a capability of the UE, and/or a position (or geographic location) of the UE, e.g., relative to the unlicensed band cell.

At 1624, the network entity may transmit, to the licensed band cell, configuration information for the unlicensed band cell. In some embodiments, the configuration information may include at least one of (and/or any, any combination of, and/or all of) an identifier for the unlicensed band cell, a cell radio network temporary identifier (C-RNTI) for the unlicensed band cell, and/or configuration requirements for CONNECTED mode on the unlicensed band cell.

At 1626, the network entity may transmit a reference signal for the unlicensed band cell to the UE.

At 1628, the network entity may receive a connection complete message from the UE. In some embodiments, the connection complete message may include a radio resource control connection complete message In some embodiments, the network entity may perform data transmissions with the UE. In some embodiments, the network entity may transmit, to the UE, a connection release message. In some embodiments, the connection release message may include an indication of redirecting the UE to licensed band cell and may optionally include an identifier of the licensed band cell.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
at least one antenna;
at least one radio coupled to the at least one antenna; and
at least one processor coupled to the at least one radio;
wherein the at least one processor is configured to cause the UE to:
camp on a licensed band cell of a radio access network (RAN);
transmit, to the licensed band cell and in response to receiving first information from the licensed band cell, a request to connect to the licensed band cell;
receive, from the licensed band cell, a connection setup message indicating a switch to an unlicensed band cell of the RAN, wherein the connection setup message includes configuration information for the unlicensed band cell, and wherein the configuration information is provided by the unlicensed band cell;
receive, from the unlicensed band cell, a reference signal; and
transmit, to the unlicensed band cell and in response to confirming, based at least in part of the reference signal, radio quality and/or downlink timing of the unlicensed band cell, a connection complete message or resume complete message.

2. The UE of claim 1,
wherein the at least one processor is further configured to cause the UE to transmit, to the licensed band cell and in response to confirming, based at least in part of the reference signal, radio quality and/or downlink timing of the unlicensed band cell is not satisfactory, a connection complete message or resume complete message.

3. The UE of claim 1,
wherein a base station supports both the licensed band cell and the unlicensed band cell, and wherein the RAN comprises 5G New Radio (5G NR) or E-UTRA (LTE or eLTE).

4. The UE of claim 1,
wherein switching the UE to the unlicensed band cell of the RAN is based on at least one of:
network policy;
network load and/or network traffic conditions;
a capability of the UE; or
a position of the UE.

5. The UE of claim 1,
wherein the connection setup message indicates at least one of:
an identifier for the unlicensed band cell;
a cell radio network temporary identifier (C-RNTI) for the unlicensed band cell; or
configuration requirements for CONNECTED mode on the unlicensed band cell.

6. The UE of claim 1,
wherein the at least one processor is further configured to cause the UE to:
receive, from the unlicensed band cell, a connection release message;
receive, for the licensed band cell, a reference signal; and
camp on the licensed band cell.

7. The UE of claim 6,
wherein the connection release message includes an indication of redirecting the UE to licensed band cell and an identifier of the licensed band cell.

8. The UE of claim 6,
wherein the at least one processor is further configured to cause the UE to:
determine that the licensed band cell is not suitable for camping; and
perform a cell selection/reselection procedure limited to the licensed band.

9. A non-transitory computer readable memory medium comprising programming instructions executable by a processor of a user equipment device (UE) to:
camp on a licensed band cell of a radio access network (RAN);
receive, from the licensed band cell, a connection setup message indicating a switch to an unlicensed band cell of the RAN, wherein the connection setup message includes configuration information for the unlicensed band cell, wherein the connection setup message is received after the UE requests connection to the licensed band cell, and wherein the configuration information is provided by the unlicensed band cell;
receive, from the unlicensed band cell, a reference signal;
initiate access with the unlicensed cell in response to confirming radio quality and/or downlink timing of the unlicensed band cell is satisfactory, wherein the confirming is based at least in part of the reference signal; and
perform data transmissions with the unlicensed band cell.

10. The non-transitory computer readable memory medium of claim 9,
wherein a base station supports both the licensed band cell and the unlicensed band cell, and wherein the RAN comprises a Fifth generation (5G) RAN operating according to a 5G New Radio (5G NR) RAT or a 4G RAN operating according to an E-UTRA (LTE or eLTE) RAT.

11. The non-transitory computer readable memory medium of claim 9,
wherein the programming instructions are further executable to receive, from the licensed band cell while camping on the licensed band cell, the unlicensed band cell remaining minimum system information (RMSI).

12. The non-transitory computer readable memory medium of claim 9,
wherein the unlicensed band cell is one of a plurality of unlicensed band cells, and wherein the programming instructions are further executable to:
receive reference signals from the plurality of unlicensed band cells; and
determine to access the unlicensed band cell based on a comparison of signal quality of the reference signal to a threshold.

13. The non-transitory computer readable memory medium of claim 9,
wherein the programming instructions are further executable to:
receive, from the unlicensed band cell, a connection release message;

receive, for the licensed band cell, a reference signal; and camp on the licensed band cell.

14. The non-transitory computer readable memory medium of claim 13, wherein the connection release message includes an indication of redirection to licensed band cell and optionally an identifier of the redirected licensed band cell.

15. The non-transitory computer readable memory medium of claim 13, wherein the programming instructions are further executable to:

determine that the licensed band cell is not suitable for camping; and perform a cell selection (or reselection) procedure.

16. An apparatus, comprising:

a memory; and at least one processor in communication with the memory;

wherein the at least one processor is configured to:

receive, from a user equipment device (UE) camping on a licensed band cell, a request to connect to the licensed band cell;

determine, based in part on one or more factors, to direct the UE to connect to an unlicensed band cell within range of the UE;

generate instructions to cause transmission of a request to switch the UE to the unlicensed band cell;

receive, from the unlicensed band cell, configuration information for the unlicensed band cell; and generate instructions to cause transmission of a setup/resume message indicating the switch to the unlicensed band cell and the configuration information for the unlicensed band cell to the UE.

17. The apparatus of claim 16, wherein the licensed band cell and the unlicensed band cell are supported by a base station, and wherein the base station is a 5G New Radio (NR) base station.

18. The apparatus of claim 16, wherein switching the UE to an unlicensed band cell is based on at least one of:

network policy;

network load and/or network traffic conditions;

a capability of the UE; or a position of the UE.

19. The apparatus of claim 16, wherein the configuration information comprises at least one of:

an identifier for the unlicensed band cell;

a cell radio network temporary identifier (C-RNTI) for the unlicensed band cell; and/or configuration requirements for CONNECTED mode on the unlicensed band cell.

20. The apparatus of claim 16, wherein the request to connect comprises a radio resource control connection request.

\* \* \* \* \*